US009619973B2

(12) United States Patent
Acres

(10) Patent No.: US 9,619,973 B2
(45) Date of Patent: Apr. 11, 2017

(54) OUTCOME DETERMINATION METHOD FOR GAMING DEVICE

(71) Applicant: Patent Investment & Licensing Company, Las Vegas, NV (US)

(72) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 0 days.

(21) Appl. No.: 14/598,060

(22) Filed: Jan. 15, 2015

(65) Prior Publication Data

US 2015/0133208 A1 May 14, 2015

Related U.S. Application Data

(63) Continuation of application No. 13/666,567, filed on Nov. 1, 2012, now Pat. No. 8,956,214, which is a (Continued)

(51) Int. Cl.

*A63F 13/00* (2014.01)
*G07F 17/34* (2006.01)
*G07F 17/32* (2006.01)

(52) U.S. Cl.

CPC .......... *G07F 17/34* (2013.01); *G07F 17/3213* (2013.01)

(58) Field of Classification Search

CPC ............. G07F 13/3239; G07F 13/3244; G07F 13/3255; G07F 17/3239; G07F 17/3244; G07F 17/3255

(Continued)

(56) References Cited

U.S. PATENT DOCUMENTS

| | | | |
|---|---|---|---|
| 2,669,389 | A | 2/1954 | Mesi et al. |
| 3,124,355 | A | 3/1964 | Mentzer |

(Continued)

FOREIGN PATENT DOCUMENTS

| | | |
|---|---|---|
| EP | 141264 | 5/1985 |
| EP | 896304 | 2/1999 |

(Continued)

OTHER PUBLICATIONS

"White Paper: An Analysis of Harrah's Total Rewards Program" written and published by Gaming Market Advisor on or before Dec. 31, 2006, retreived URL <http://www.gamingmarketadvisors.com/publications/Harrahs%20Total%20Reward%20White%20Paper.pdf>, 41 pages.

(Continued)

*Primary Examiner* — James S McClellan
(74) *Attorney, Agent, or Firm* — Marger Johnson

(57) ABSTRACT

Embodiments of this concept are directed to a method of operating a gaming device to determine game outcomes by using a range of game numbers for winning game outcomes. That is, the gaming device includes a range of numbers associated with a generic winning outcome or each winning outcome to ensure that a winning outcome or specific winning outcome will hit within the specified range. This method may be used a variety of game types including slot machines, video poker, keno, video pachinko, etc. These gaming machines may additionally include one or more proximity indicators or meters associated with the various outcomes.

10 Claims, 16 Drawing Sheets

Related U.S. Application Data continuation of application No. 12/579,310, filed on Oct. 14, 2009, now Pat. No. 8,313,369.

(58) Field of Classification Search
USPC ............................................. 463/16, 20, 25
See application file for complete search history.

(56) References Cited

U.S. PATENT DOCUMENTS

| | | | |
|---|---|---|---|
| 3,124,674 | A | 3/1964 | Edwards |
| 3,684,290 | A | 8/1972 | Wayne |
| 3,727,213 | A | 4/1973 | Kurtenbach |
| 3,751,040 | A | 8/1973 | Carey |
| 4,240,635 | A | 12/1980 | Brown |
| 4,254,404 | A | 3/1981 | White |
| 4,433,844 | A | 2/1984 | Hooker et al. |
| 4,624,459 | A | 11/1986 | Kaufman |
| 4,657,256 | A | 4/1987 | Okada |
| 4,669,731 | A | 6/1987 | Clarke |
| 4,836,546 | A | 6/1989 | DiRe et al. |
| 4,887,813 | A | 12/1989 | Chiles, III et al. |
| 5,022,653 | A | 6/1991 | Suttle et al. |
| 5,024,439 | A | 6/1991 | Okada |
| 5,027,102 | A | 6/1991 | Sweeny |
| 5,031,914 | A | 7/1991 | Rosenthal |
| 5,078,405 | A | 1/1992 | Jones et al. |
| 5,083,785 | A * | 1/1992 | Okada ................. G07F 17/3244 273/143 R |
| 5,152,529 | A | 10/1992 | Okada |
| 5,178,395 | A | 1/1993 | Lovell |
| 5,221,083 | A | 6/1993 | Dote |
| 5,265,880 | A | 11/1993 | Maksymec |
| 5,342,049 | A | 8/1994 | Wichinsky et al. |
| 5,364,104 | A | 11/1994 | Jones et al. |
| 5,377,973 | A | 1/1995 | Jones et al. |
| 5,380,008 | A | 1/1995 | Mathis et al. |
| 5,490,670 | A | 2/1996 | Hobert |
| 5,536,016 | A | 7/1996 | Thompson |
| 5,564,700 | A | 10/1996 | Celona |
| 5,584,485 | A | 12/1996 | Jones et al. |
| 5,586,766 | A | 12/1996 | Forte et al. |
| 5,655,961 | A | 8/1997 | Acres et al. |
| 5,674,128 | A | 10/1997 | Holch et al. |
| 5,695,402 | A | 12/1997 | Stupak |
| 5,697,844 | A | 12/1997 | Von Kohorn |
| 5,743,798 | A | 4/1998 | Adams et al. |
| 5,758,875 | A | 6/1998 | Giacalone, Jr. |
| 5,766,076 | A | 6/1998 | Pease et al. |
| 5,816,918 | A | 10/1998 | Kelly et al. |
| 5,830,064 | A | 11/1998 | Bradish et al. |
| 5,836,816 | A | 11/1998 | Bruin et al. |
| 5,836,817 | A | 11/1998 | Acres et al. |
| 5,851,147 | A | 12/1998 | Stupak et al. |
| 5,910,048 | A | 6/1999 | Feinberg |
| 5,913,726 | A | 6/1999 | Jones et al. |
| 5,934,998 | A | 8/1999 | Forte et al. |
| 5,941,770 | A | 8/1999 | Miers et al. |
| 5,960,406 | A | 9/1999 | Rasansky et al. |
| 5,984,779 | A | 11/1999 | Bridgeman et al. |
| 6,003,013 | A | 12/1999 | Boushy et al. |
| 6,012,983 | A | 1/2000 | Walker et al. |
| 6,024,642 | A | 2/2000 | Stupak |
| 6,030,109 | A | 2/2000 | Lobsenz |
| 6,032,955 | A | 3/2000 | Luciano et al. |
| 6,045,130 | A | 4/2000 | Jones et al. |
| 6,048,272 | A | 4/2000 | Tsujita |
| 6,059,659 | A | 5/2000 | Busch et al. |
| 6,077,163 | A | 6/2000 | Walker et al. |
| 6,086,477 | A | 7/2000 | Walker et al. |
| 6,106,395 | A | 8/2000 | Begis |
| 6,110,041 | A | 8/2000 | Walker et al. |
| 6,110,043 | A | 8/2000 | Olsen |
| 6,135,884 | A | 10/2000 | Hedrick et al. |
| 6,146,273 | A | 11/2000 | Olsen |
| 6,165,071 | A | 12/2000 | Weiss |
| 6,168,521 | B1 | 1/2001 | Luciano et al. |
| 6,183,362 | B1 | 2/2001 | Boushy |
| 6,186,892 | B1 | 2/2001 | Frank et al. |
| 6,186,893 | B1 | 2/2001 | Walker et al. |
| 6,196,918 | B1 | 3/2001 | Miers et al. |
| 6,210,276 | B1 | 4/2001 | Mullins |
| 6,217,448 | B1 | 4/2001 | Olsen |
| 6,224,482 | B1 | 5/2001 | Bennett |
| 6,234,900 | B1 | 5/2001 | Cumbers |
| 6,254,483 | B1 | 7/2001 | Acres |
| 6,264,560 | B1 | 7/2001 | Goldberg et al. |
| 6,270,409 | B1 * | 8/2001 | Shuster ............... G07F 17/3244 273/143 R |
| 6,289,382 | B1 | 9/2001 | Bowman-Amuah |
| 6,293,866 | B1 | 9/2001 | Walker et al. |
| 6,293,868 | B1 | 9/2001 | Bernard |
| 6,302,793 | B1 | 10/2001 | Fertitta, III et al. |
| 6,315,662 | B1 | 11/2001 | Jorasch et al. |
| 6,315,666 | B1 | 11/2001 | Mastera et al. |
| 6,319,122 | B1 | 11/2001 | Packes et al. |
| 6,319,125 | B1 | 11/2001 | Acres |
| 6,336,859 | B2 | 1/2002 | Jones et al. |
| 6,347,996 | B1 | 2/2002 | Gilmore et al. |
| 6,364,314 | B1 | 4/2002 | Canterbury |
| 6,364,768 | B1 | 4/2002 | Acres et al. |
| 6,368,216 | B1 | 4/2002 | Hedrick et al. |
| 6,371,852 | B1 | 4/2002 | Acres |
| 6,375,567 | B1 | 4/2002 | Acres |
| 6,425,823 | B1 | 7/2002 | Byrne |
| 6,428,002 | B1 | 8/2002 | Baranauskas |
| 6,443,456 | B1 | 9/2002 | Gajor |
| 6,454,648 | B1 | 9/2002 | Kelly et al. |
| 6,457,045 | B1 | 9/2002 | Hanson et al. |
| 6,471,588 | B2 | 10/2002 | Sakamoto |
| 6,485,367 | B1 | 11/2002 | Joshi |
| 6,485,368 | B2 | 11/2002 | Jones et al. |
| 6,520,856 | B1 | 2/2003 | Walker et al. |
| 6,537,150 | B1 | 3/2003 | Luciano et al. |
| 6,565,434 | B1 | 5/2003 | Acres |
| 6,565,436 | B1 | 5/2003 | Baerlocher |
| 6,569,013 | B1 | 5/2003 | Taylor |
| 6,575,832 | B1 | 6/2003 | Manfredi et al. |
| 6,592,457 | B1 | 7/2003 | Frohm et al. |
| 6,599,186 | B1 | 7/2003 | Walker et al. |
| 6,599,193 | B2 | 7/2003 | Baerlocher et al. |
| 6,606,615 | B1 | 8/2003 | Jennings et al. |
| 6,620,046 | B2 | 9/2003 | Rowe |
| 6,634,922 | B1 | 10/2003 | Driscoll et al. |
| 6,648,757 | B1 | 11/2003 | Slomiany et al. |
| 6,652,378 | B2 | 11/2003 | Cannon et al. |
| 6,656,047 | B1 | 12/2003 | Tarantino et al. |
| 6,695,700 | B2 | 2/2004 | Walker et al. |
| 6,697,165 | B2 | 2/2004 | Wakai et al. |
| 6,702,670 | B2 | 3/2004 | Jasper et al. |
| 6,709,331 | B2 | 3/2004 | Berman |
| 6,712,693 | B1 | 3/2004 | Hettinger |
| 6,712,695 | B2 | 3/2004 | Mothwurf et al. |
| 6,722,985 | B2 | 4/2004 | Criss-Puszkiewicz et al. |
| 6,749,510 | B2 | 6/2004 | Giobbi |
| 6,751,657 | B1 | 6/2004 | Zothner |
| 6,755,420 | B2 | 6/2004 | Colton |
| 6,758,754 | B1 | 7/2004 | Lavanchy et al. |
| 6,760,595 | B2 | 7/2004 | Inselberg |
| 6,780,104 | B2 | 8/2004 | Fox |
| 6,786,824 | B2 | 9/2004 | Cannon |
| 6,800,026 | B2 | 10/2004 | Cannon |
| 6,800,027 | B2 | 10/2004 | Giobbi et al. |
| 6,802,778 | B1 | 10/2004 | Lemay et al. |
| 6,811,482 | B2 | 11/2004 | Letovsky |
| 6,811,486 | B1 | 11/2004 | Luciano, Jr. |
| 6,860,808 | B2 | 3/2005 | Levitan |
| 6,860,810 | B2 | 3/2005 | Cannon et al. |
| 6,939,227 | B2 | 9/2005 | Jorasch et al. |
| 6,944,509 | B2 | 9/2005 | Altmaier et al. |
| 6,948,171 | B2 | 9/2005 | Dan et al. |
| 6,965,868 | B1 | 11/2005 | Bednarek |
| 6,973,665 | B2 | 12/2005 | Dudkiewicz et al. |
| RE38,982 | E | 2/2006 | Forte et al. |
| 6,997,380 | B2 | 2/2006 | Safaei et al. |

(56) References Cited

U.S. PATENT DOCUMENTS

| | | | |
|---|---|---|---|
| 6,998,806 | B2 | 2/2006 | Suzuki |
| 7,037,195 | B2 | 5/2006 | Schneider et al. |
| 7,048,628 | B2 | 5/2006 | Schneider |
| 7,056,210 | B2 | 6/2006 | Bansemer et al. |
| 7,069,232 | B1 | 6/2006 | Fox et al. |
| 7,090,579 | B2 | 8/2006 | Tarantino |
| 7,094,149 | B2 | 8/2006 | Walker et al. |
| 7,094,150 | B2 | 8/2006 | Ungaro et al. |
| 7,103,560 | B1 | 9/2006 | Fox et al. |
| 7,131,908 | B2 | 11/2006 | Baerlocher |
| 7,144,322 | B2 | 12/2006 | Gomez et al. |
| 7,160,189 | B2 | 1/2007 | Walker et al. |
| 7,169,052 | B2 | 1/2007 | Beaulieu et al. |
| 7,175,521 | B2 | 2/2007 | McClintic |
| 7,182,690 | B2 | 2/2007 | Giobbi et al. |
| 7,184,965 | B2 | 2/2007 | Fox et al. |
| 7,186,181 | B2 | 3/2007 | Rowe |
| 7,192,346 | B2 | 3/2007 | Mathis |
| 7,195,243 | B2 | 3/2007 | Kenny et al. |
| 7,201,654 | B1 | 4/2007 | Jarvis et al. |
| 7,210,998 | B2 | 5/2007 | Kazaoka et al. |
| 7,251,805 | B2 | 7/2007 | Koo |
| 7,300,351 | B2 | 11/2007 | Thomas |
| 7,329,185 | B2 | 2/2008 | Conover et al. |
| 7,338,372 | B2 | 3/2008 | Morrow et al. |
| 7,361,089 | B2 | 4/2008 | Daly et al. |
| 7,374,486 | B2 | 5/2008 | Baerlocher |
| 7,410,422 | B2 | 8/2008 | Fine |
| 7,416,186 | B2 | 8/2008 | Walker et al. |
| 7,458,892 | B2 | 12/2008 | Walker et al. |
| 7,594,851 | B2 | 9/2009 | Falconer |
| 7,601,060 | B2 | 10/2009 | Baerlocher et al. |
| 7,628,691 | B2 | 12/2009 | Luciano et al. |
| 7,674,180 | B2 | 3/2010 | Graham et al. |
| 7,704,137 | B2 | 4/2010 | Englman |
| 7,717,788 | B2 | 5/2010 | Rowe |
| 7,744,453 | B2 | 6/2010 | Pacey |
| 7,762,886 | B2 | 7/2010 | Pfennighausen et al. |
| 7,765,121 | B2 | 7/2010 | Pace et al. |
| 7,775,875 | B2 | 8/2010 | Nguyen et al. |
| 7,775,876 | B2 | 8/2010 | Rowe |
| 7,780,520 | B2 | 8/2010 | Baerlocher |
| 7,811,167 | B2 | 10/2010 | Giobbi et al. |
| 7,846,018 | B2 | 12/2010 | Baerlocher |
| 7,857,693 | B1 | 12/2010 | Johnson et al. |
| 7,874,911 | B2 | 1/2011 | Walker et al. |
| 7,942,735 | B2 | 5/2011 | Meyer et al. |
| 7,963,844 | B2 | 6/2011 | Walker et al. |
| 8,052,517 | B2 | 11/2011 | Manfredi et al. |
| 8,062,124 | B2 | 11/2011 | Jaffe |
| 8,133,105 | B2 | 3/2012 | Walker et al. |
| 8,475,254 | B2 | 7/2013 | Acres |
| 8,545,319 | B2 | 10/2013 | Kaneko |
| 2001/0004609 | A1 | 6/2001 | Walker et al. |
| 2001/0024015 | A1 | 9/2001 | Hogan et al. |
| 2001/0046893 | A1 | 11/2001 | Giobbi et al. |
| 2001/0048193 | A1 | 12/2001 | Yoseloff et al. |
| 2002/0013173 | A1 | 1/2002 | Walker et al. |
| 2002/0016202 | A1 | 2/2002 | Fertitta et al. |
| 2002/0019253 | A1 | 2/2002 | Reitzen et al. |
| 2002/0032052 | A1 | 3/2002 | Levitan |
| 2002/0034981 | A1 | 3/2002 | Hisada |
| 2002/0039923 | A1 | 4/2002 | Cannon et al. |
| 2002/0055381 | A1 | 5/2002 | Tarantino |
| 2002/0058545 | A1 | 5/2002 | Luciano |
| 2002/0086726 | A1 | 7/2002 | Ainsworth |
| 2002/0094855 | A1 | 7/2002 | Berman |
| 2002/0103018 | A1 | 8/2002 | Rommerdahl et al. |
| 2002/0107072 | A1 | 8/2002 | Giobbi |
| 2002/0123376 | A1 | 9/2002 | Walker et al. |
| 2002/0132664 | A1 | 9/2002 | Miller et al. |
| 2002/0142825 | A1 | 10/2002 | Lark et al. |
| 2002/0143652 | A1 | 10/2002 | Beckett |
| 2002/0147040 | A1 | 10/2002 | Walker et al. |
| 2002/0147043 | A1 | 10/2002 | Shulman et al. |
| 2002/0152120 | A1 | 10/2002 | Howington |
| 2002/0167126 | A1 | 11/2002 | De Raedt et al. |
| 2002/0177480 | A1 | 11/2002 | Rowe |
| 2002/0177483 | A1 | 11/2002 | Cannon |
| 2002/0187834 | A1 | 12/2002 | Rowe et al. |
| 2002/0193162 | A1 | 12/2002 | Walker et al. |
| 2003/0003989 | A1 | 1/2003 | Johnson |
| 2003/0013512 | A1 | 1/2003 | Rowe |
| 2003/0013516 | A1 | 1/2003 | Walker et al. |
| 2003/0017865 | A1 | 1/2003 | Beaulieu et al. |
| 2003/0032474 | A1 | 2/2003 | Kaminkow |
| 2003/0036425 | A1 | 2/2003 | Kaminkow et al. |
| 2003/0054875 | A1 | 3/2003 | Marks et al. |
| 2003/0054878 | A1 | 3/2003 | Benoy et al. |
| 2003/0054881 | A1 | 3/2003 | Hedrick et al. |
| 2003/0060276 | A1 | 3/2003 | Walker et al. |
| 2003/0064769 | A1 | 4/2003 | Muir |
| 2003/0064771 | A1 | 4/2003 | Morrow et al. |
| 2003/0067116 | A1 | 4/2003 | Colton |
| 2003/0078101 | A1 | 4/2003 | Schneider et al. |
| 2003/0083943 | A1 | 5/2003 | Adams et al. |
| 2003/0087685 | A1 | 5/2003 | Hogan et al. |
| 2003/0092484 | A1 | 5/2003 | Schneider et al. |
| 2003/0100360 | A1 | 5/2003 | Manfredi et al. |
| 2003/0114217 | A1 | 6/2003 | Walker et al. |
| 2003/0119575 | A1 | 6/2003 | Centuori et al. |
| 2003/0135304 | A1 | 7/2003 | Sroub et al. |
| 2003/0144048 | A1 | 7/2003 | Silva |
| 2003/0178774 | A1 | 9/2003 | Marcilio |
| 2003/0186733 | A1 | 10/2003 | Wolf et al. |
| 2003/0187736 | A1 | 10/2003 | Teague et al. |
| 2003/0190944 | A1 | 10/2003 | Manfredi et al. |
| 2003/0195029 | A1 | 10/2003 | Frohm et al. |
| 2003/0199295 | A1 | 10/2003 | Vancura |
| 2003/0199312 | A1 | 10/2003 | Walker et al. |
| 2003/0204474 | A1 | 10/2003 | Capek et al. |
| 2003/0207711 | A1 | 11/2003 | Rowe |
| 2003/0209853 | A1 | 11/2003 | Harris |
| 2003/0211884 | A1 | 11/2003 | Gauselmann |
| 2003/0216169 | A1 | 11/2003 | Walker et al. |
| 2003/0220138 | A1 | 11/2003 | Walker et al. |
| 2003/0220139 | A1 | 11/2003 | Peterson |
| 2003/0220143 | A1 | 11/2003 | Shteyn et al. |
| 2003/0228901 | A1 | 12/2003 | Walker et al. |
| 2003/0232640 | A1 | 12/2003 | Walker et al. |
| 2003/0234489 | A1 | 12/2003 | Okada |
| 2003/0236110 | A1 | 12/2003 | Beaulieu et al. |
| 2004/0009808 | A1 | 1/2004 | Gauselmann |
| 2004/0029631 | A1 | 2/2004 | Duhamel |
| 2004/0038735 | A1 | 2/2004 | Steil et al. |
| 2004/0038736 | A1 | 2/2004 | Bryant et al. |
| 2004/0048650 | A1 | 3/2004 | Mierau et al. |
| 2004/0053657 | A1 | 3/2004 | Fiden et al. |
| 2004/0053681 | A1 | 3/2004 | Jordan et al. |
| 2004/0063484 | A1 | 4/2004 | Dreaper et al. |
| 2004/0072609 | A1 | 4/2004 | Ungaro et al. |
| 2004/0103013 | A1 | 5/2004 | Jameson |
| 2004/0121833 | A1 | 6/2004 | Mezen et al. |
| 2004/0142742 | A1 | 7/2004 | Schneider et al. |
| 2004/0158536 | A1 | 8/2004 | Kowal et al. |
| 2004/0166940 | A1 | 8/2004 | Rothschild |
| 2004/0180722 | A1 | 9/2004 | Giobbi |
| 2004/0185932 | A1 | 9/2004 | Lombardo |
| 2004/0198485 | A1 | 10/2004 | Loose et al. |
| 2004/0203611 | A1 | 10/2004 | Laporta et al. |
| 2004/0204213 | A1 | 10/2004 | Schugar et al. |
| 2004/0204216 | A1 | 10/2004 | Schugar |
| 2004/0204222 | A1 | 10/2004 | Roberts |
| 2004/0214637 | A1 | 10/2004 | Nonaka |
| 2004/0219967 | A1 | 11/2004 | Giobbi et al. |
| 2004/0224750 | A1 | 11/2004 | Al-Ziyoud |
| 2004/0229671 | A1 | 11/2004 | Stronach et al. |
| 2004/0229683 | A1 | 11/2004 | Mothwurf et al. |
| 2004/0229700 | A1 | 11/2004 | Cannon et al. |
| 2004/0235542 | A1 | 11/2004 | Stronach et al. |
| 2004/0248642 | A1 | 12/2004 | Rothschild |
| 2004/0254010 | A1 | 12/2004 | Fine |
| 2004/0266517 | A1 | 12/2004 | Bleich et al. |
| 2005/0014558 | A1 | 1/2005 | Estey |

(56) References Cited

U.S. PATENT DOCUMENTS

2005/0026674 A1 2/2005 Wolf et al.
2005/0043072 A1 2/2005 Nelson
2005/0043088 A1 2/2005 Nguyen et al.
2005/0043092 A1 2/2005 Gauselmann
2005/0043094 A1 2/2005 Nguyen et al.
2005/0049028 A1 3/2005 Gornez et al.
2005/0054438 A1 3/2005 Rothschild et al.
2005/0059467 A1 3/2005 Saffari et al.
2005/0070356 A1 3/2005 Mothwurf et al.
2005/0075164 A1 4/2005 Krynicky
2005/0096121 A1 5/2005 Gilliland et al.
2005/0096124 A1 5/2005 Stronach
2005/0101375 A1 5/2005 Webb et al.
2005/0101379 A1 5/2005 Falconer
2005/0119052 A1 6/2005 Russell et al.
2005/0124411 A1 6/2005 Schneider et al.
2005/0124415 A1 6/2005 Centuori et al.
2005/0148380 A1 7/2005 Cannon et al.
2005/0148383 A1 7/2005 Mayeroff
2005/0153773 A1 7/2005 Nguyen et al.
2005/0164764 A1 7/2005 Ghaly
2005/0181856 A1 8/2005 Cannon et al.
2005/0181860 A1 8/2005 Nguyen et al.
2005/0181862 A1 8/2005 Asher et al.
2005/0187014 A1 8/2005 Saffari et al.
2005/0208995 A1 9/2005 Marshall et al.
2005/0215311 A1 9/2005 Hornik et al.
2005/0215314 A1 9/2005 Schneider et al.
2005/0215316 A1 9/2005 Rowe et al.
2005/0233794 A1 10/2005 Cannon et al.
2005/0239541 A1 10/2005 Jorasch et al.
2005/0239545 A1 10/2005 Rowe
2005/0251440 A1 11/2005 Bednarek
2005/0255902 A1 11/2005 Lind
2005/0266905 A1 12/2005 Emori et al.
2006/0009284 A1 1/2006 Schwartz et al.
2006/0025205 A1 2/2006 Casey et al.
2006/0025207 A1 2/2006 Walker et al.
2006/0025210 A1 2/2006 Johnson
2006/0030391 A1 2/2006 Casey et al.
2006/0030400 A1 2/2006 Mathis
2006/0040723 A1 2/2006 Baerlocher et al.
2006/0040730 A1 2/2006 Walker et al.
2006/0046830 A1 3/2006 Webb
2006/0046835 A1 3/2006 Walker et al.
2006/0052160 A1 3/2006 Saffari et al.
2006/0058095 A1 3/2006 Berman et al.
2006/0058097 A1 3/2006 Berman et al.
2006/0063578 A1 3/2006 Bansemer et al.
2006/0068898 A1 3/2006 Maya
2006/0068899 A1 3/2006 White et al.
2006/0068903 A1 3/2006 Walker et al.
2006/0073872 A1 4/2006 B-Jensen et al.
2006/0073887 A1 4/2006 Nguyen et al.
2006/0079310 A1 4/2006 Friedman et al.
2006/0079314 A1 4/2006 Walker et al.
2006/0084496 A1 4/2006 Jaffe et al.
2006/0094493 A1 5/2006 Kido
2006/0100009 A1 5/2006 Walker et al.
2006/0105836 A1 5/2006 Walker et al.
2006/0116201 A1 6/2006 Gauselmann
2006/0121972 A1 6/2006 Walker et al.
2006/0121981 A1 6/2006 Pfennighausen et al.
2006/0128467 A1 6/2006 Thomas
2006/0135249 A1 6/2006 Seelig et al.
2006/0148559 A1 7/2006 Jordan et al.
2006/0149632 A1 7/2006 Register et al.
2006/0154714 A1 7/2006 Montross et al.
2006/0174270 A1 8/2006 Westberg et al.
2006/0183530 A1 8/2006 Ellis
2006/0183536 A1 8/2006 Gagner et al.
2006/0189363 A1 8/2006 Strom
2006/0189378 A1 8/2006 Aoki
2006/0199631 A1 9/2006 McGill et al.
2006/0205483 A1 9/2006 Meyer et al.
2006/0211486 A1 9/2006 Walker et al.
2006/0217175 A1 9/2006 Walker et al.
2006/0229127 A1 10/2006 Walker et al.
2006/0234791 A1 10/2006 Nguyen et al.
2006/0247034 A1 11/2006 Schneider et al.
2006/0247041 A1 11/2006 Walker et al.
2006/0252510 A1 11/2006 Walker et al.
2006/0252512 A1 11/2006 Walker et al.
2006/0252516 A1 11/2006 Walker et al.
2006/0258422 A1 11/2006 Walker et al.
2006/0258425 A1 11/2006 Edidin et al.
2006/0258432 A1 11/2006 Packer et al.
2006/0287034 A1 12/2006 Englman et al.
2006/0287045 A1 12/2006 Walker et al.
2006/0287098 A1 12/2006 Morrow et al.
2006/0287102 A1 12/2006 White et al.
2007/0001396 A1 1/2007 Walker et al.
2007/0010309 A1 1/2007 Giobbi et al.
2007/0010315 A1 1/2007 Hein
2007/0050256 A1 3/2007 Walker et al.
2007/0060252 A1 3/2007 Taylor
2007/0060274 A1 3/2007 Rowe et al.
2007/0060323 A1 3/2007 Isaac et al.
2007/0060387 A1 3/2007 Enzminger et al.
2007/0087806 A1 4/2007 Luciano et al.
2007/0105615 A1 5/2007 Lind
2007/0105618 A1 5/2007 Steil
2007/0106553 A1 5/2007 Jordan et al.
2007/0111776 A1 5/2007 Griswold et al.
2007/0112609 A1 5/2007 Howard et al.
2007/0117619 A1 5/2007 Walker et al.
2007/0117623 A1 5/2007 Nelson et al.
2007/0129147 A1 6/2007 Gagner
2007/0135214 A1 6/2007 Walker et al.
2007/0143156 A1 6/2007 van Deursen
2007/0167210 A1 7/2007 Kelly et al.
2007/0184897 A1 8/2007 Fujimoto
2007/0191087 A1 8/2007 Thomas et al.
2007/0197247 A1 8/2007 Inselberg
2007/0205556 A1 9/2007 Roemer et al.
2007/0259709 A1 11/2007 Kelly et al.
2007/0275777 A1 11/2007 Walker et al.
2007/0293302 A1 12/2007 Lind et al.
2008/0015004 A1 1/2008 Gatto et al.
2008/0015006 A1 1/2008 George
2008/0039190 A1 2/2008 Walker et al.
2008/0058105 A1 3/2008 Combs et al.
2008/0064495 A1 3/2008 Bryant et al.
2008/0076576 A1 3/2008 Graham et al.
2008/0090651 A1 4/2008 Baerlocher
2008/0096636 A1 4/2008 Power
2008/0102921 A1 5/2008 Urquhart
2008/0102935 A1 5/2008 Finnimore
2008/0113744 A1 5/2008 Whitcher
2008/0113749 A1 5/2008 Williams et al.
2008/0113777 A1 5/2008 Anderson
2008/0113779 A1 5/2008 Cregan
2008/0113811 A1 5/2008 Linard et al.
2008/0132320 A1 6/2008 Rodgers
2008/0146331 A1 6/2008 Nordman et al.
2008/0153564 A1 6/2008 Baerlocher et al.
2008/0171586 A1 7/2008 Roemer
2008/0176647 A1 7/2008 Acres
2008/0182655 A1 7/2008 DeWaal et al.
2008/0207313 A1 8/2008 Acres
2008/0220840 A1 9/2008 Katz et al.
2008/0220861 A1 9/2008 Okada
2008/0234035 A1 9/2008 Malek
2008/0242394 A1 10/2008 Sakuma
2008/0242398 A1 10/2008 Harris et al.
2008/0248851 A1 10/2008 Bloom
2008/0254886 A1 10/2008 Kelly
2008/0261699 A1 10/2008 Topham et al.
2008/0268959 A1 10/2008 Bryson et al.
2008/0280674 A1 11/2008 Sakuma
2008/0287186 A1 11/2008 Sakuma
2008/0293467 A1 11/2008 Mathis
2008/0311973 A1 12/2008 Jaffe
2008/0318656 A1 12/2008 Walker et al.

(56) References Cited

U.S. PATENT DOCUMENTS

| | | | |
|---|---|---|---|
| 2009/0005170 | A9 | 1/2009 | Kelly et al. |
| 2009/0036202 | A1 | 2/2009 | Baerlocher et al. |
| 2009/0070081 | A1 | 3/2009 | Saenz et al. |
| 2009/0075728 | A1 | 3/2009 | Acres |
| 2009/0088239 | A1 | 4/2009 | Iddings et al. |
| 2009/0088252 | A1 | 4/2009 | Nicely et al. |
| 2009/0093289 | A1 | 4/2009 | Toyoda |
| 2009/0117981 | A1 | 5/2009 | Yoshizawa |
| 2009/0118005 | A1 | 5/2009 | Kelly et al. |
| 2009/0124327 | A1 | 5/2009 | Caputo et al. |
| 2009/0124364 | A1 | 5/2009 | Cuddy et al. |
| 2009/0131175 | A1 | 5/2009 | Kelly et al. |
| 2009/0170608 | A1 | 7/2009 | Herrmann et al. |
| 2009/0176580 | A1 | 7/2009 | Herrmann et al. |
| 2009/0233682 | A1 | 9/2009 | Kato et al. |
| 2009/0239601 | A1 | 9/2009 | Macke |
| 2009/0239622 | A1 | 9/2009 | Fujimori et al. |
| 2009/0239628 | A1 | 9/2009 | Fujimori et al. |
| 2009/0247284 | A1 | 10/2009 | Sugiyama et al. |
| 2009/0253477 | A1 | 10/2009 | Teranishi |
| 2009/0253478 | A1 | 10/2009 | Walker et al. |
| 2009/0253490 | A1 | 10/2009 | Teranishi |
| 2009/0258693 | A1 | 10/2009 | Preston |
| 2009/0270168 | A1 | 10/2009 | Englman et al. |
| 2009/0286590 | A1 | 11/2009 | Bennett |
| 2009/0325669 | A1 | 12/2009 | Kelly et al. |
| 2009/0325670 | A1 | 12/2009 | Kelly et al. |
| 2010/0016055 | A1 | 1/2010 | Englman |
| 2010/0041464 | A1 | 2/2010 | Arezina et al. |
| 2010/0048286 | A1 | 2/2010 | Okada et al. |
| 2010/0056248 | A1 | 3/2010 | Acres |
| 2010/0075741 | A1 | 3/2010 | Aoki et al. |
| 2010/0105454 | A1 | 4/2010 | Weber et al. |
| 2010/0105466 | A1 | 4/2010 | Inamure et al. |
| 2010/0113130 | A1 | 5/2010 | Kamano et al. |
| 2010/0124981 | A1 | 5/2010 | Kato et al. |
| 2010/0124988 | A1 | 5/2010 | Amos et al. |
| 2010/0210336 | A1 | 8/2010 | Berman et al. |
| 2010/0210338 | A1 | 8/2010 | Taylor |
| 2010/0285867 | A1 | 11/2010 | Okada |
| 2010/0304834 | A1 | 12/2010 | Okada |
| 2011/0039615 | A1 | 2/2011 | Acres |
| 2011/0081958 | A1 | 4/2011 | Herrmann et al. |
| 2011/0159950 | A1 | 6/2011 | Okada |
| 2011/0165938 | A1 | 7/2011 | Anderson et al. |
| 2011/0218030 | A1 | 9/2011 | Acres |
| 2011/0275438 | A9 | 11/2011 | Hardy et al. |
| 2011/0281632 | A1 | 11/2011 | Okada |
| 2011/0287826 | A1 | 11/2011 | Kato et al. |
| 2011/0294563 | A1 | 12/2011 | Jaffe |
| 2012/0077565 | A1 | 3/2012 | Barbalet |
| 2012/0108337 | A1 | 5/2012 | Kelly et al. |
| 2012/0115566 | A1 | 5/2012 | Fujisawa et al. |
| 2012/0122558 | A1 | 5/2012 | Lyons et al. |
| 2012/0135800 | A1 | 5/2012 | Acres |
| 2012/0172108 | A1 | 7/2012 | Acres |
| 2012/0172130 | A1 | 7/2012 | Acres |
| 2012/0190425 | A1 | 7/2012 | Barbalet |

FOREIGN PATENT DOCUMENTS

| | | |
|---|---|---|
| EP | 896308 | 2/1999 |
| EP | 919965 | 6/1999 |
| EP | 981397 | 3/2000 |
| EP | 1091789 | 4/2001 |
| EP | 1231577 | 8/2002 |
| EP | 1351180 | 10/2003 |
| EP | 1369830 | 12/2003 |
| EP | 1490849 | 12/2004 |
| EP | 1496419 | 1/2005 |
| EP | 1623375 | 2/2006 |
| EP | 1637196 | 3/2006 |
| EP | 1832952 | 9/2007 |
| JP | 2-21883 | 1/1990 |
| WO | 95/21665 | 8/1995 |
| WO | 95/31262 | 11/1995 |
| WO | 96/35490 | 11/1995 |
| WO | 97/46293 | 12/1997 |
| WO | 00/17825 | 3/2000 |
| WO | 00/32286 | 6/2000 |
| WO | 00/64545 | 11/2000 |
| WO | 01/36059 | 5/2001 |
| WO | 01/59680 | 8/2001 |
| WO | 01/80961 | 11/2001 |
| WO | 03/066179 | 8/2003 |
| WO | 03/089092 | 10/2003 |
| WO | 2005/029279 | 3/2005 |
| WO | 2005/029287 | 3/2005 |
| WO | 2005/099845 | 10/2005 |
| WO | 2005/113093 | 12/2005 |
| WO | 2006/014745 | 2/2006 |
| WO | 2006/014770 | 2/2006 |
| WO | 2006/014990 | 2/2006 |
| WO | 2006/032498 | 3/2006 |
| WO | 2006/036948 | 4/2006 |
| WO | 2006/055518 | 5/2006 |
| WO | 2006/060442 | 6/2006 |
| WO | 2006/060493 | 6/2006 |
| WO | 2007/087286 | 8/2007 |
| WO | 2008/024705 | 2/2008 |

OTHER PUBLICATIONS

Acres, John, An Ingenious Internet Marketing Tool, Slot Operations Management / Casino Enterprise Management, Aug. 2007, pp. 8-10.

Acres, John, Measuring the Player Experience: What a Squiggly Line Can Tell You, Inside Edge / Slot Manager, Jan. / Feb., pp. 28-29.

Acres, John, The Future of Gaming, Where Will You be in 10 Years? Slot Operations Management, / Casino Enterprise Management, Jul. 2007, pp. 8-10, 12.

* cited by examiner

Paytable

| Outcome | Pay | Average Games | Game Range | Hit Freq | Contribution |
|---|---|---|---|---|---|
| Cherries | 2 | 12 | 24 | 8.33% | 0.16666667 |
| Any Bars | 3 | 15 | 30 | 6.67% | 0.2 |
| Single Bars | 5 | 45 | 90 | 2.22% | 0.11111111 |
| Double Bars | 10 | 90 | 180 | 1.11% | 0.11111111 |
| Triple Bars | 20 | 225 | 450 | 0.44% | 0.08888889 |
| Sevens (7s) | 50 | 450 | 900 | 0.22% | 0.11111111 |
| Bonus | 60 | 560 | 1120 | 0.18% | 0.10714286 |
| Jackpot | 100 | 2245 | 4490 | 0.04% | 0.04454343 |
| | | | | **19.22%** | **94.06%** |

FIG. 4A

Reel Strips

| Stop # | Reel 1 | Reel 2 | Reel 3 |
|---|---|---|---|
| 1 | | | |
| 2 | CH | 7 | BN |
| 3 | | | |
| 4 | BAR | BAR | DB |
| 5 | | | |
| 6 | 7 | DB | BAR |
| 7 | | | |
| 8 | DB | TB | TB |
| 9 | | | |
| 10 | JP | 7 | 7 |
| 11 | | | |
| 12 | TB | CH | JP |
| 13 | | | |
| 14 | BAR | BAR | CH |
| 15 | | | |
| 16 | CH | TB | BAR |
| 17 | | | |
| 18 | DB | DB | DB |
| 19 | | | |
| 20 | 7 | JP | TB |
| 21 | | | |
| 22 | TB | CH | CH |

FIG. 4B

Selection Chart

| Outcome | Pay | Game Range | First Selection | Second Selection | Third Selection | Fourth Selection | Fifth Selection | Sixth Selection | Seventh Selection | Eigth Selection | Ninth Selection | Tenth Selection |
|---|---|---|---|---|---|---|---|---|---|---|---|---|
| Cherries | 2 | 24 | 3 | 14 | 22 | 20 | 16 | 1 | 18 | 12 | 10 | 15 |
| Any Bars | 3 | 30 | 2 | 28 | 15 | 10 | 24 | 14 | 9 | 16 | 21 | 13 |
| Single Bars | 5 | 90 | 53 | 14 | 86 | 66 | 88 | 32 | 58 | 15 | 26 | 77 |
| Double Bars | 10 | 180 | 67 | 87 | 147 | 102 | 136 | 127 | 150 | 75 | 33 | 70 |
| Triple Bars | 20 | 450 | 269 | 230 | 283 | 326 | 340 | 258 | 147 | 272 | 432 | 16 |
| Sevens (7s) | 50 | 900 | 835 | 261 | 848 | 528 | 434 | 241 | 200 | 898 | 337 | 472 |
| Bonus | 60 | 1120 | 199 | 584 | 799 | 827 | 74 | 1030 | 568 | 317 | 978 | 24 |
| Jackpot | 100 | 4490 | 2756 | 585 | 1542 | 4436 | 490 | 2490 | 2111 | 1921 | 82 | 288 |

FIG. 4C

| Game No. | Game Outcome | Game No. | Game Outcome |
|---|---|---|---|
| 1 | Loss | 51 | Loss |
| 2 | Any Bars | 52 | Loss |
| 3 | Cherries | 53 | Single Bars |
| 4 | Loss | 54 | Loss |
| 5 | Loss | 55 | Any Bars |
| 6 | Loss | 56 | Loss |
| 7 | Loss | 57 | Loss |
| 8 | Loss | 58 | Loss |
| 9 | Loss | 59 | Cherries |
| 10 | Loss | 60 | Loss |
| 11 | Loss | 61 | Loss |
| 12 | Loss | 62 | Loss |
| 13 | Loss | 63 | Loss |
| 14 | Loss | 64 | Loss |
| 15 | Loss | 65 | Loss |
| 16 | Loss | 66 | Loss |
| 17 | Cherries | 67 | Double Bars/Single Bars |
| 18 | Loss | 68 | Loss |
| 19 | Loss | 69 | Loss |
| 20 | Loss | 70 | Loss |
| 21 | Loss | 71 | Loss |
| 22 | Loss | 72 | Loss |
| 23 | Loss | 73 | Loss |
| 24 | Loss | 74 | Loss |
| 25 | Loss | 75 | Cherries |
| 26 | Loss | 76 | Cherries |
| 27 | Loss | 77 | Loss |
| 28 | Loss | 78 | Loss |
| 29 | Loss | 79 | Any Bars |
| 30 | Any Bars | 80 | Loss |
| 31 | Loss | 81 | Loss |
| 32 | Loss | 82 | Loss |
| 33 | Loss | 83 | Loss |
| 34 | Loss | 84 | Loss |
| 35 | Loss | 85 | Loss |
| 36 | Loss | 86 | Loss |
| 37 | Loss | 87 | Loss |
| 38 | Loss | 88 | Loss |
| 39 | Cherries | 89 | Loss |
| 40 | Loss | 90 | Loss |
| 41 | Loss | 91 | Loss |
| 42 | Loss | 92 | Loss |
| 43 | Loss | 93 | Any Bars |
| 44 | Loss | 94 | Cherries |
| 45 | Any Bars | 95 | Loss |
| 46 | Loss | 96 | Loss |
| 47 | Loss | 97 | Loss |
| 48 | Loss | 98 | Loss |
| 49 | Loss | 99 | Loss |
| 50 | Loss | 100 | Loss |

FIG. 4D

| Game No. | CH | Game No. | AB | Game No. | Bars | Game No. | DB | Game No. | TB | Game No. | 7 | Game No. | BN | Game No. | JP |
|---|---|---|---|---|---|---|---|---|---|---|---|---|---|---|---|
| 1 | L | 1 | L | 1 | L | 1 | L | 1 | L | 1 | L | 1 | L | 1 | L |
| 2 | L | 2 | L | 2 | L | 2 | L | 2 | L | 2 | L | 2 | L | 2 | L |
| 3 | L | 3 | L | 3 | L | 3 | L | 3 | L | 3 | L | 3 | L | 3 | L |
| 4 | L | 4 | L | 4 | L | 4 | L | 4 | L | 4 | L | 4 | L | 4 | L |
| 5 | L | 5 | L | 5 | L | 5 | L | 5 | L | 5 | L | 5 | L | 5 | L |
| 6 | L | 6 | L | 6 | L | 6 | Win | 6 | L | 6 | L | 6 | L | 6 | L |
| 7 | L | 7 | L | 7 | L | 7 | | 7 | L | 7 | L | 7 | L | 7 | L |
| 8 | L | 8 | L | 8 | L | 8 | | 8 | L | 8 | L | 8 | L | 8 | L |
| 9 | L | 9 | L | 9 | L | 9 | | 9 | L | 9 | L | 9 | L | 9 | L |
| 10 | L | 10 | L | 10 | L | 10 | | 10 | L | 10 | L | 10 | L | 10 | L |
| 11 | L | 11 | Win | 11 | L | 11 | | 11 | L | 11 | L | 11 | L | 11 | L |
| 12 | L | 12 | | 12 | L | 12 | | 12 | L | 12 | L | 12 | L | 12 | L |
| 13 | L | 13 | | 13 | L | 13 | | 13 | L | 13 | L | 13 | L | 13 | L |
| 14 | L | 14 | | 14 | L | 14 | | 14 | L | 14 | L | 14 | L | 14 | L |
| 15 | L | 15 | | 15 | L | 15 | | 15 | L | 15 | L | 15 | L | 15 | L |
| 16 | L | 16 | | 16 | L | 16 | | 16 | L | 16 | L | 16 | L | 16 | L |
| 17 | Win | 17 | | 17 | L | 17 | | 17 | L | 17 | L | 17 | L | 17 | L |
| 18 | | 18 | | 18 | L | 18 | | 18 | L | 18 | L | 18 | L | 18 | L |
| 19 | | 19 | | 19 | L | 19 | | 19 | L | 19 | L | 19 | L | 19 | L |
| 20 | | 20 | | 20 | L | 20 | | 20 | L | 20 | L | 20 | L | 20 | L |
| 21 | | 21 | | 21 | L | 21 | | 21 | L | 21 | L | 21 | L | 21 | L |
| 22 | | 22 | | 22 | L | 22 | | 22 | L | 22 | L | 22 | L | 22 | L |
| 23 | | 23 | | 23 | L | 23 | | 23 | L | 23 | L | 23 | L | 23 | L |
| 24 | | 24 | | 24 | L | 24 | | 24 | L | 24 | L | 24 | L | 24 | L |
| | | 25 | | 25 | L | 25 | | 25 | L | 25 | L | 25 | L | 25 | L |
| | | 26 | | 26 | L | 26 | | 26 | L | 26 | L | 26 | L | 26 | L |
| | | 27 | | 27 | L | 27 | | 27 | L | 27 | L | 27 | L | 27 | L |
| | | 28 | | 28 | L | 28 | | 28 | L | 28 | L | 28 | L | 28 | L |
| | | 29 | | 29 | L | 29 | | 29 | L | 29 | L | 29 | L | 29 | L |
| | | 30 | | 30 | L | 30 | | 30 | L | 30 | L | 30 | L | 30 | L |
| | | | | 31 | L | 31 | | 31 | L | 31 | L | 31 | L | 31 | L |
| | | | | 32 | L | 32 | | 32 | L | 32 | L | 32 | L | 32 | L |
| | | | | 33 | L | 33 | | 33 | L | 33 | L | 33 | L | 33 | L |
| | | | | 34 | L | 34 | | 34 | L | 34 | L | 34 | L | 34 | L |
| | | | | 35 | L | 35 | | 35 | L | 35 | L | 35 | L | 35 | L |
| | | | | 36 | L | 36 | | 36 | L | 36 | L | 36 | L | 36 | L |
| | | | | 37 | L | 37 | | 37 | L | 37 | L | 37 | L | 37 | L |
| | | | | 38 | L | 38 | | 38 | L | 38 | L | 38 | L | 38 | L |
| | | | | 39 | L | 39 | | 39 | L | 39 | L | 39 | L | 39 | L |
| | | | | 40 | L | 40 | | 40 | L | 40 | L | 40 | L | 40 | L |
| | | | | 41 | L | 41 | | 41 | L | 41 | L | 41 | L | 41 | L |
| | | | | 42 | L | 42 | | 42 | L | 42 | L | 42 | L | 42 | L |
| | | | | 43 | L | 43 | | 43 | L | 43 | L | 43 | L | 43 | L |
| | | | | 44 | L | 44 | | 44 | L | 44 | L | 44 | L | 44 | L |
| | | | | 45 | L | 45 | | 45 | L | 45 | L | 45 | L | 45 | L |
| | | | | 46 | L | 46 | | 46 | L | 46 | L | 46 | L | 46 | L |
| | | | | 47 | L | 47 | | 47 | L | 47 | L | 47 | L | 47 | L |
| | | | | 48 | L | 48 | | 48 | L | 48 | L | 48 | L | 48 | L |
| | | | | 49 | L | 49 | | 49 | L | 49 | L | 49 | L | 49 | L |
| | | | | 50 | L | 50 | | 50 | L | 50 | L | 50 | L | 50 | L |
| | | | | ... | | ... | | ... | | ... | | ... | | ... | |

FIG. 4E

OUTCOME DETERMINATION METHOD FOR GAMING DEVICE

RELATED APPLICATION

This application claims priority and is a continuation application of U.S. patent application Ser. No. 13/666,567 titled OUTCOME DETERMINATION METHOD FOR GAMING DEVICE, filed Nov. 1, 2012, which is a continuation application of U.S. Pat. No. 8,313,369 titled OUTCOME DETERMINATION METHOD FOR GAMING DEVICE, issued Nov. 20, 2012, which is incorporated by reference.

FIELD OF THE INVENTION

This disclosure relates generally to gaming devices, and more particularly to outcome determination methods for use with gaming devices.

BACKGROUND

Typically game results of gaming devices are determined by analyzing a series of random selections associated with the game. For example, in spinning reel slot machines, a reel-stop position for each reel is randomly selected. Once each random selection is made, the combination of randomly selected reel-stop positions is analyzed to determine if the combination of symbols associated with the reel-stop positions results in an award for the player. Similarly, in video poker or blackjack random cards are selected and then analyzed to see if the combination of randomly selected cards results in an award for the player.

The process of making a series of random selections and then analyzing the results of these selections imposes several limitations both in the capabilities of gaming devices and the design of the games on the gaming devices. For the game devices themselves, the above process relies on multiple random selections in order to arrive at a specific outcome, which often makes for a very skewed distribution timelines for some awards and bonuses. Additionally, this conventional process limits the flexibility of the machine in awarding specific outcomes resulting from other triggering events. In the slot machine example, a random number must be used for each reel to determine which reel stop or stops are to be displayed on a game outcome display. With this conventional technique, large awards, for example, may hit on average only once every 10,000 games and secondary bonus games may hit, for example, once every 75 games on average. Due to the random nature of the determination process, however, the large award may still not have hit 100,000 games after the last time it hit. The bonus, on the other hand, may hit two times in a row and then not hit again for 250 games. Players are aware of the volatile nature of gaming devices; however, a player that experiences a long losing streak or a long streak with no significant wins may get frustrated and leave. Even if a player is not aware that a bonus may hit, for example, every 75 games on average, the player may expect the bonus or another significant award to occur periodically to stem the continued reduction of credits on the games credit meter from placing repeated wagers on the gaming device.

For demonstration purposes, certain reel stop combinations can be programmed into the game logic to illustrate a particular bonus or jackpot win. However, during actual game play in which a player is wagering on the outcome of the gaming device, the game outcomes are often limited by the combination of randomly selected reel stops; thereby limiting the ability to dictate certain symbol combinations displayed on the reels in response to triggering events. This dictation of certain symbol combinations may be desirable to alter the payback percentage of the gaming devices, provide bonuses to the players, or guarantee that certain gaming events happen within a given time frame.

In addition, during the design of a gaming device having spinning reels, it is often difficult to obtain multiple exact payback percentages for a given gaming machine because of the limitations involved in assigning values to each reel stop and/or setting up reel strips. For mechanical spinning reel games, reel strips typically include twenty-two physical reel stops. Game designers may assign a certain number of virtual stops or paytable stops to each of these physical stops to allow large prizes to be given away less than once every 10,648 spins. This allocation of virtual stops can be challenging when attempting to meet multiple precise payback percentage paytables as well as difficult in setting hit frequencies of winning symbol combinations. For multi-line video slot games, more precise payback percentage paytables are easier to obtain, but it still is difficult to balance the desired hit frequencies of certain outcomes with dialing in the desired payback percentage for the entire game paytable.

BRIEF DESCRIPTION OF THE DRAWINGS

FIG. 4A is an illustrated representation of an exemplary paytable for a gaming device according to embodiments of the invention.

FIG. 4B is an illustrated representation of exemplary reel strips for a gaming device according to embodiments of the invention.

FIG. 4C is an illustrated representation of an exemplary outcome selection chart for a gaming device according to embodiments of the invention.

FIG. 4D is an illustrated representation of an exemplary game outcome table for a gaming device according to embodiments of the invention.

FIG. 4E is an illustrated representation of another exemplary game outcome table for a gaming device according to embodiments of the invention.

DETAILED DESCRIPTION

Figure 1A:
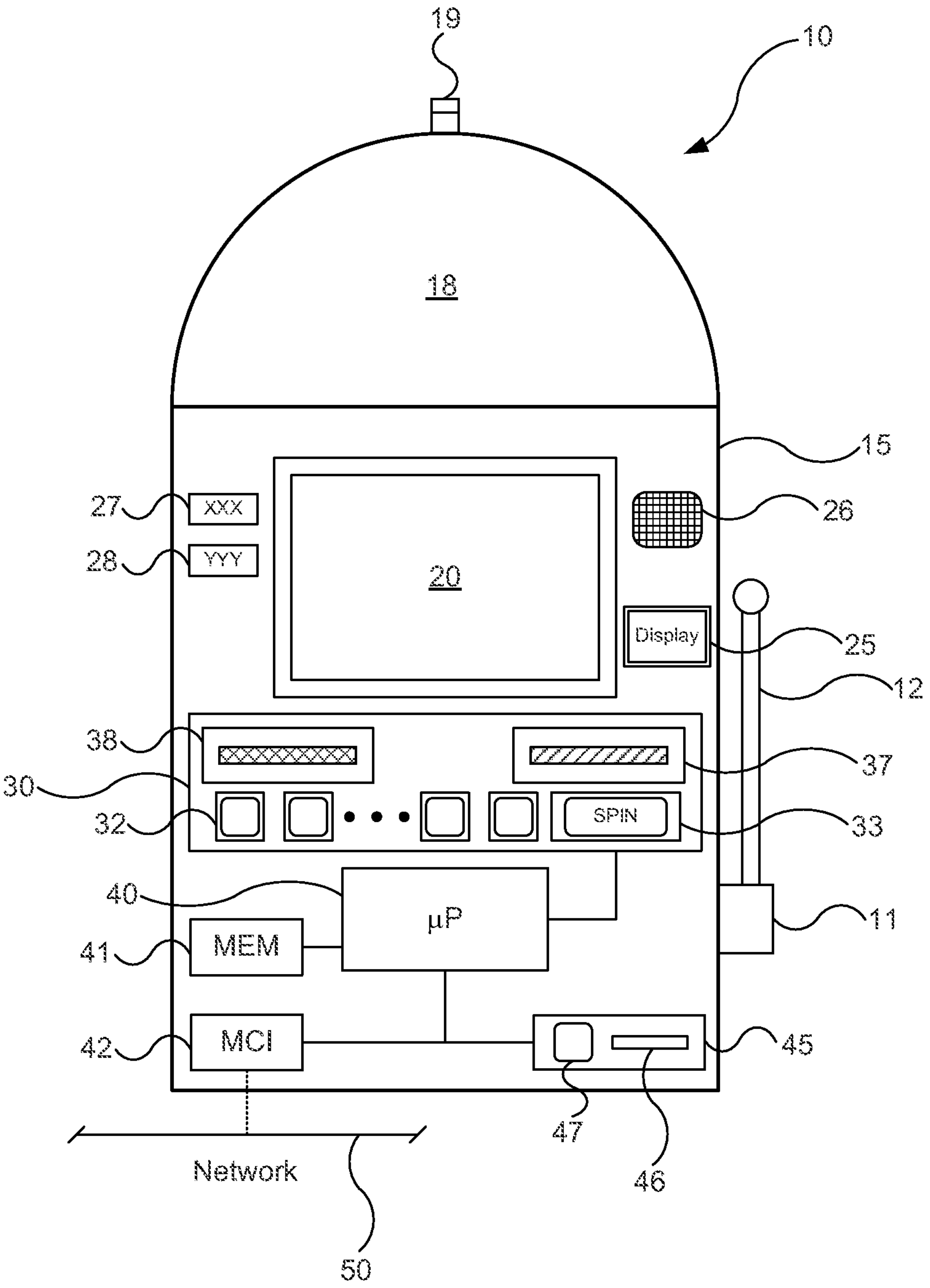
FIG. 1A is a functional block diagram that illustrates a gaming device according to embodiments of the invention.
Figure 1B:
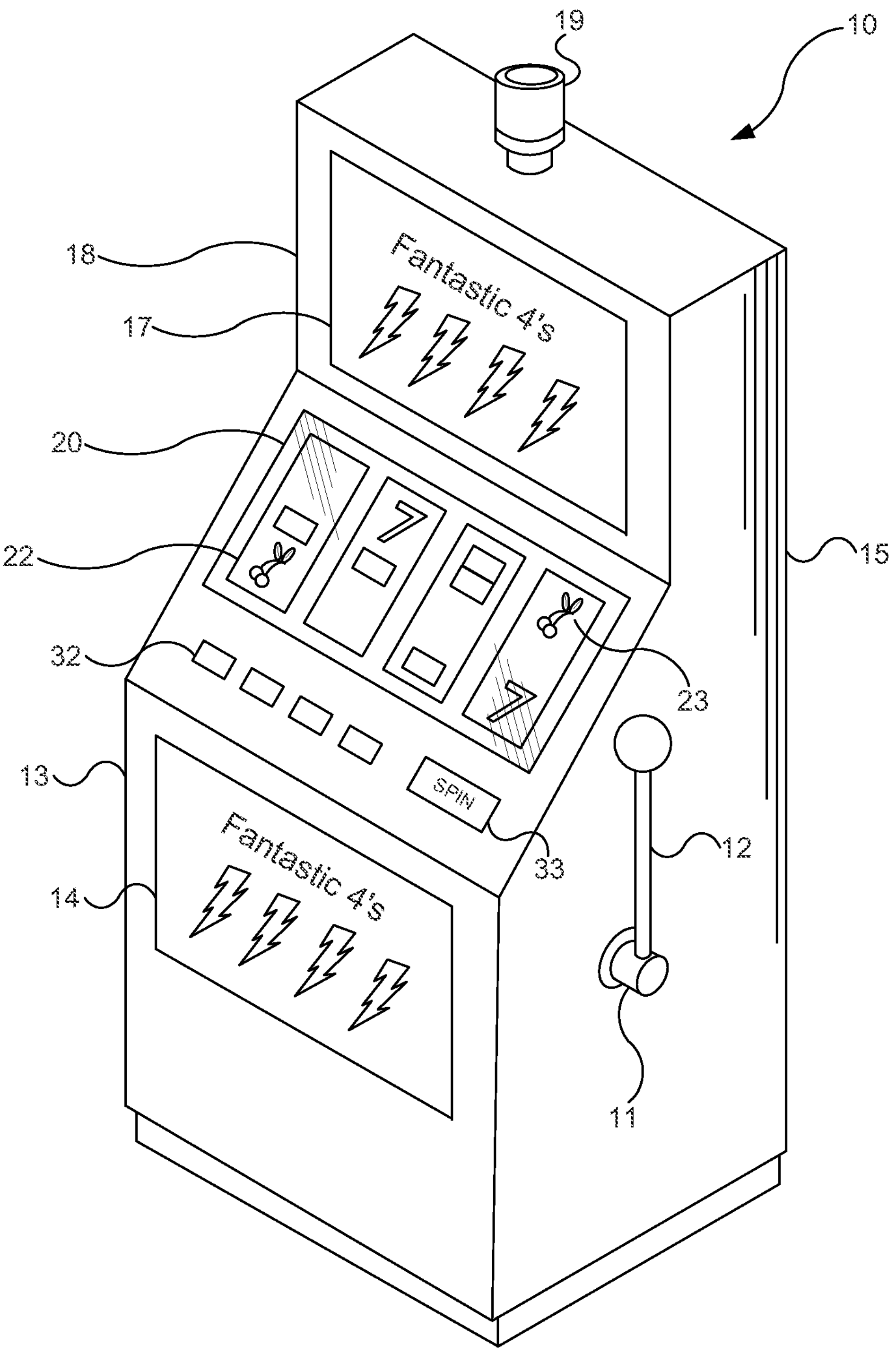
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

A player typically plays the gaming device 10 by placing a wager and activating an input mechanism to initiate a game associated with the placed wager. As used herein, a gaming event refers to any activity that affects the calculation or display of a game outcome. Game events include interactions occurring between the gaming device 10, the player, and/or a connected game system. Example gaming events include a player inserting a player account card in a gaming device, a double-pay bonus time period activation, a first spinning reel coming to a stop, a player's input to hold a card in a poker hand, etc. A game refers to the calculation and completion of one game outcome. That is, a game includes a single game cycle that begins with the initiation of the wagered upon game and ends with the completion of all activities relating to the wager placed including any intervening bonuses. In other words, a game encompasses all gaming events dependent on a placed wager during an initiated game including all amounts due the player that are paid directly by the gaming machine, or as a manual payment by casino personnel to the player playing that gaming machine. For example, if an item was awarded as a result of a wager that could be saved and used later, the game would encompass the awarding of the item, which is part of the game outcome, but not the later use of that item since the later use would affect a different game outcome. A game session refers to one or more played games. For example, a game session for a particular player may include each game played on a specific gaming device, each game played between insertions of money or credits, each game played between an initial money or credit insertion and a cash-out or zeroing out of credits, each game played during a casino stay, or each game played over a predetermined time period. Alternatively, game sessions may refer to games played by multiple players over a specified time period or event period with respect to a particular gaming device or group of gaming devices.

The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The game may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a game.

If the game does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
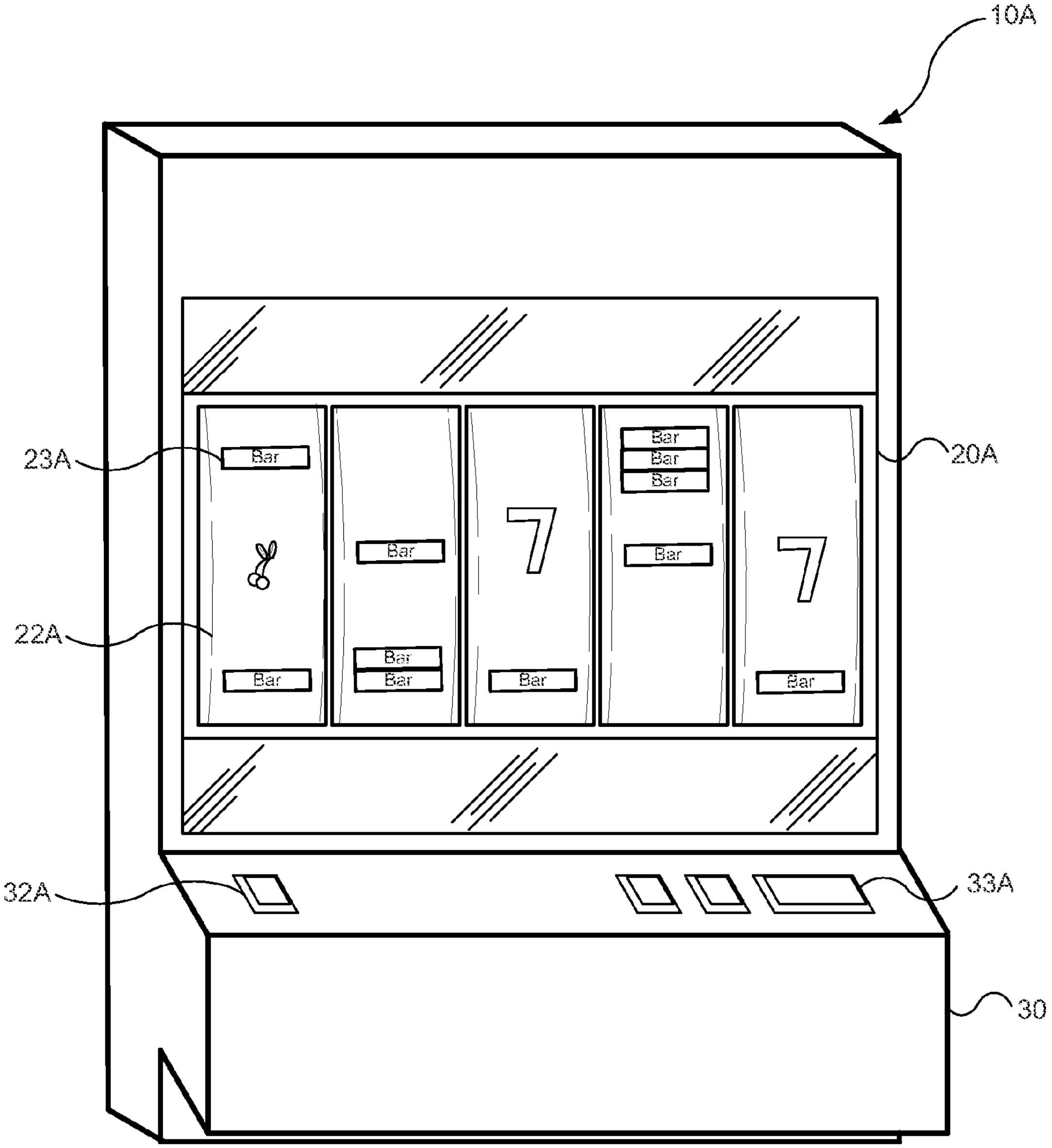
FIGS. 2A, 2B, and 2C are detail diagrams of exemplary types of gaming devices according to embodiments of the invention.
Figure 2B:
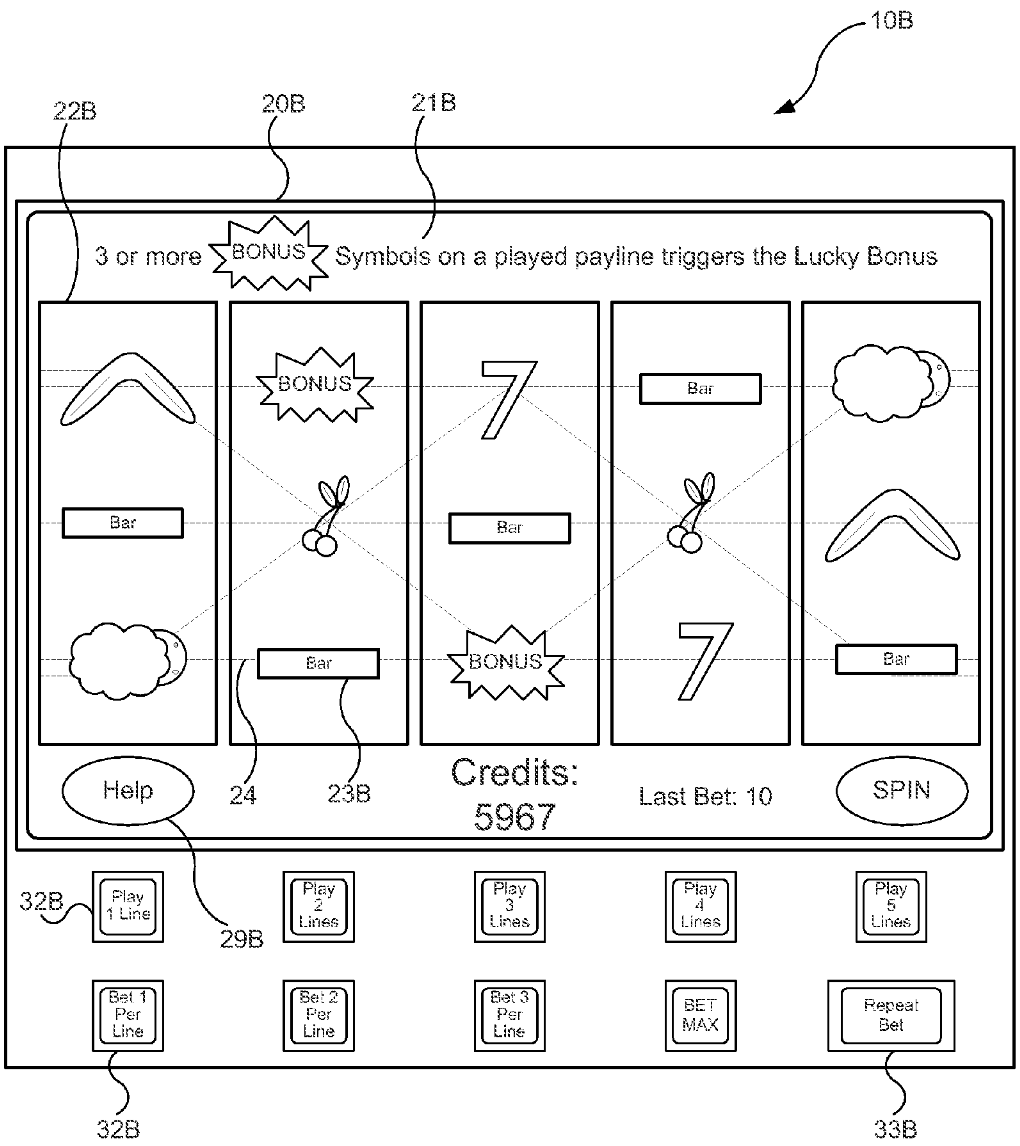
Figure 2C:
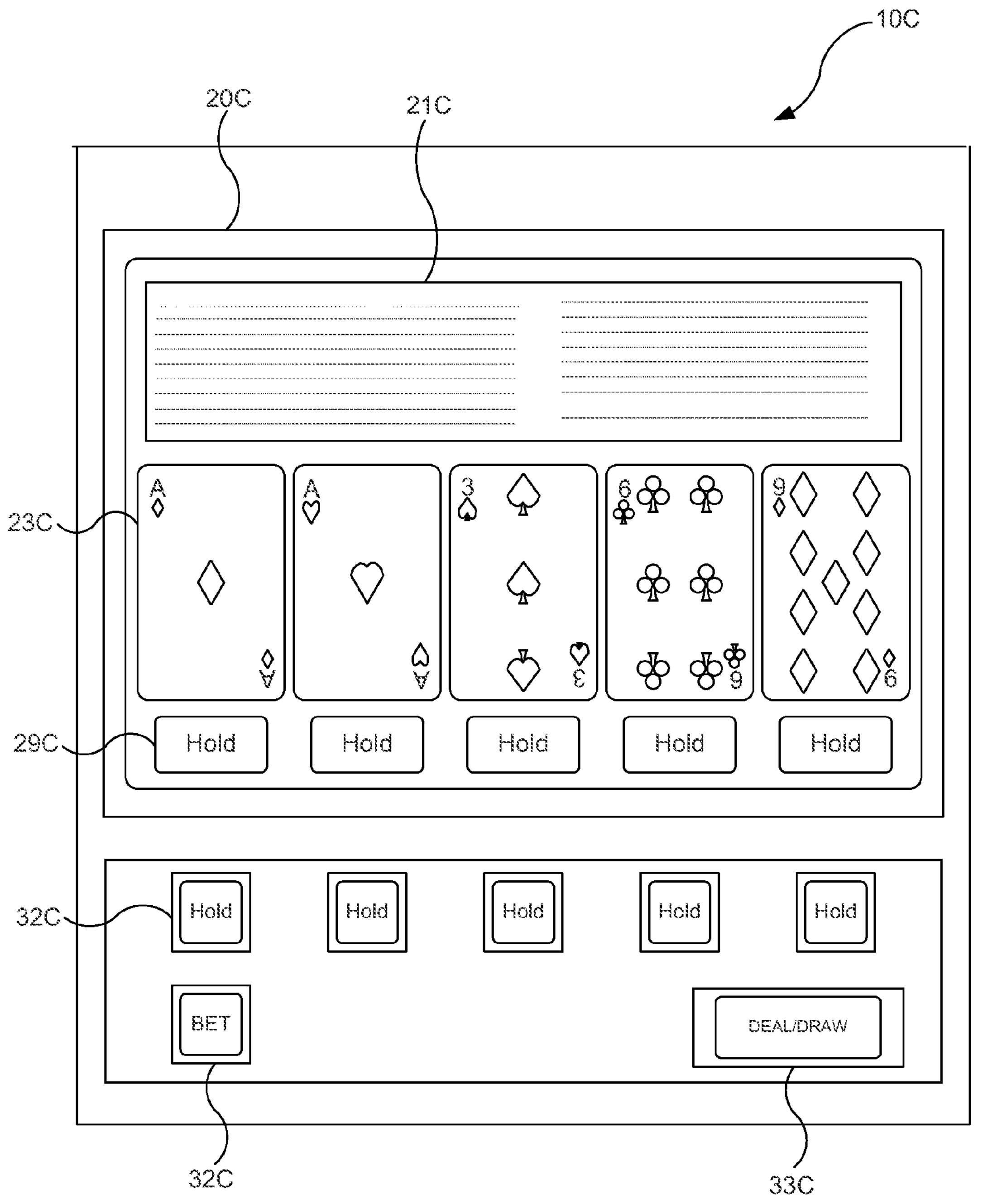

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A game on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the games. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the game ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five games, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a game. A repeat bet or spin button 33B may also be used to initiate each game when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a game after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
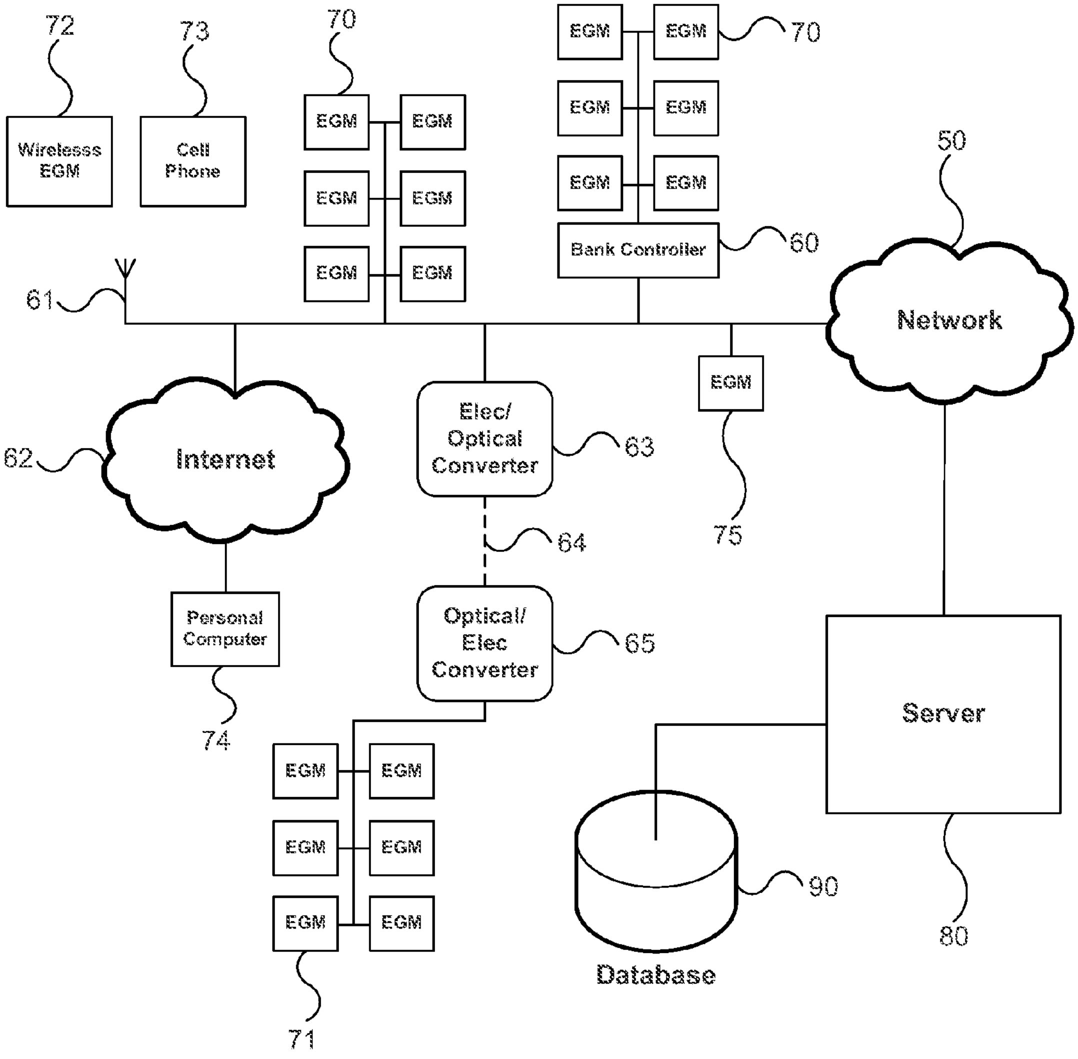
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

As discussed above, in conventional gaming devices, specific outcomes may appear very infrequently due to the random nature of conventional game outcome determination techniques. Mystery bonuses awarded to a lucky gaming device in a plurality of gaming devices sometime use a set range of time, games played, etc. to limit the duration between bonus awards. In these Mystery bonuses, a "lucky coin" or "lucky time slot" is selected as a bonus trigger within the specified range. When the trigger condition is satisfied, the bonus is awarded. However, these mystery bonuses are limited to play on a group of machines and are related to bonus awards beyond the scope of the game paytable. Hence, an underlying gaming device maintains its conventional base game outcome determination method and is not guaranteed to ever be awarded the mystery bonus, no matter how long it is active on a gaming floor since there are typically a large number of machines eligible for the mystery award.

Embodiments of this concept are directed to a method of operating a gaming device to determine game outcomes by using at least one range for determining a winning game outcome. In some embodiments, the gaming device includes a range of numbers associated with each winning outcome to ensure that the outcome will hit within the specified range. This method may be used for each winning outcome for a variety of games including slot machines, video poker, keno, video pachinko, etc. The gaming devices may include one or more proximity meters associated with these winning outcomes. The ranges for each outcome may be fixed by a game designer, they may be flexibly set by a casino operator, or they may be dynamically alterable during game play based on triggering game events. Additionally, in some embodiments, the upper limits of the ranges may be variable and set through a random selection process or other selection process.

The outcome triggering positions within each range may be selected at random, selected using a weighted scale, selected in response to specific gaming event or instruction, or chosen using another selection technique. Typically, higher paying outcomes will have much larger ranges than lower paying outcomes so that, on average, they do not hit as often. Even so, this structuring of outcomes may make games perform more consistently since all awards (even jackpots) will each hit within specified limits. In some gaming machine embodiments, such as multi-reel slot games or video poker, winning outcomes including combinations of symbols or cards (e.g., BAR BAR BAR) associated with awards are assigned a range from which an outcome trigger is selected. However, in other gaming machine embodiments, such as a single reel game, video pachinko, or a proximity meter only game, each symbol itself may be assigned a range from which an outcome trigger is selected. In either type of embodiment, games played that are not associated with a winning outcome result in a losing outcome. The display for these losing outcomes may still be determined at random or by another selection process to vary the display of a loss.

In other embodiments, a single range may be used for determining when a generic winning game outcome occurs and a weighted table may be used to select which of the possible winning game outcomes is used as the displayed winning game outcome. For example, for a game with a desired hit frequency of about 20% a game range of 1 through 10 may be used for selecting a winning game outcome. If a winning outcome is selected at game number 3, the game may display losing outcomes for the first two games wagered upon and display a winning game outcome on the third wagered-on game. A table of possible winning game outcomes may be used to determine which of the winning game outcomes is awarded. Usually, game outcomes associated with lower paying awards would come up more frequently in the weighted table than bonus or jackpot awards. A weighted game range may also be used to extend the possible range of games between wins, while maintaining a desired hit frequency.

Selection processes for game outcomes for use on gaming devices will now be discussed. Some of these selection processes utilize an outcome selection process described in detail in patent application Ser. No. 12/542,587, filed on Aug. 17, 2009, entitled DETERMINATION OF GAME RESULT USING RANDOM OVERALL OUTCOME SUMMARY (hereinafter referred to as "the Ser. No. 12/542,587 application"), the teachings of which are incorporated herein by reference. In other embodiments, other selection processes may be utilized to determine game outcomes. Some these selection processes may include random outcome selections that utilize an outcome tracking process to track specific awards and force a gaming device to provide the specific award if it has not been awarded at random within a specified range of games or time of game play. To further explain some of these selection processes, two examples are explained in detail with reference to FIGS. 4A-4E.

FIG. 4A is an illustrated representation of an exemplary paytable for a gaming device according to embodiments of the invention. FIG. 4B is an illustrated representation of exemplary reel strips for a gaming device according to embodiments of the invention. FIG. 4C is an illustrated representation of an exemplary outcome selection chart for a gaming device according to embodiments of the invention. FIG. 4D is an illustrated representation of an exemplary game outcome table for a gaming device according to embodiments of the invention. FIG. 4E is an illustrated representation of another exemplary game outcome table for a gaming device according to embodiments of the invention.

The exemplary gaming device to be used with the described paytable and reel strips is a spinning reel slot machine similar to the ones illustrated in FIG. 2A or 2B, but with three spinning reels instead of five spinning reels and a single payline in the center of the game display. Note that the paytable of FIG. 4A is similar in some respects to the paytable shown in FIG. 4A of the Ser. No. 12/542,587 application, and that the reel strips of FIG. 4B is identical to the reel strips shown in FIG. 4B of the Ser. No. 12/542,587 application.

Referring to the paytable shown in FIG. 4A, eight possible winning game outcomes are listed in the left column of the paytable under the heading "Outcome." As defined in this application, a winning outcome is any outcome that is associated with an award, prize, or other incentive given to the player as a result of the outcome. On the other hand, a losing outcome is an outcome that is not associated with an award, prize, or other incentive. The pay for each outcome is located in the adjacent column labeled "Pay." For example, the pay associated with the winning outcome of cherries (which is when the CH symbol on each reel appears on the payline, i.e., CH CH CH) is 2 credits or two times the number of credits wagered. The next outcome of "Any Bars," represents outcomes where three bar-style symbols land on the payline, but do not all match each other. A single bar outcome, a double bar outcome, a triple bar outcome, and a sevens outcome are listed next. Since a bonus symbol "BN" (FIG. 4B) only appears on the third gaming reel, a winning bonus outcome would take the form of "X X BN," where the "X" symbol represents any symbol appearing on reels one and two. This bonus outcome may trigger a secondary screen bonus, a wheel-spin bonus, a fixed prize bonus, or any other type of bonus. The credit value of 60 is associated with this bonus outcome and represents the average pay of the bonus. Since the bonus may include many different outcomes ranging from a small award or even no award, to a very large award, the paytable need only reflect the average value of these awards. Finally, jackpot winning outcome pays a top award of 100 credits when it appears on a payline.

The "Average Game" column provides a numerical value of the number games on average occur between instances of an associated outcome. The "Game Range" column species the range of games win which each associated winning outcome must hit. Note that the Average Game number and the "Game Range" number are related. In this example, the Average Games value is simply median number of the Game Range since the trigger value for the game outcome is selected at random from the numerical value of the Game Range. However, in other embodiments, certain portions of the game range may be weighted to encourage an outcome to occur in specific portions of the range. In these embodiments, the Average Game value may reflect the mean value within the weighted range. For example, if game range associated with the Cherries outcome was weighted toward the upper end of the game range, that is, for example, range numbers 18 through 20 were given higher weights than the rest of the numbers in the range, the Average Game number may be closer to 16 instead of 12.

In embodiments where the range of game numbers is alterable by a casino operator or dynamically alterable during game play in response to gaming events, either the Average Game value or the Game Range value for one or more winning game outcomes may be modified. For example, if the Average Game value was altered in the paytable illustrated in FIG. 4A for the Cherries outcome from 12 to 10, the Game Range value may automatically be updated to a value of 20. Similarly, if the Game Range value was altered for the Cherries outcome from 24 to 30, the Average Game value may automatically be updated to 15 games.

The "Hit Frequency" column reflects what percentage of spins will result in a corresponding outcome. The hit frequency is simply determined by inverting the "Average Games" column. For example, the single bar outcome has an Average Game Value of 45 and a hit frequency of 2.22%. This means that a player is expected to hit a single bar outcome about every 45 games. Thus, the Game Range and Average Game values are important elements in determining hit frequency, payback percentage, and volatility of the game. When developing a game paytable, a game designer can alter the types of winning outcomes, the pay of the winning outcomes, and the weight of the paytable weight of an outcome to produce the play characteristics of the gaming device. However, once the determination is made about what symbol combinations will be winning outcomes and what award each of those winning outcomes should pay, the main variable in altering the play characteristics of the gaming device is one of the Game Range or Average Game values associated with each outcome. Unlike traditional games, the games associated with embodiments of this concept allow the game designer to control the hit frequency of specific game outcomes by manipulating the paytable weights associated with those game outcomes. Additionally, the overall hit frequency of a gaming device and the volatility of the gaming device can be quickly shaped using these variables. In the example paytable illustrated in FIG. 4A, the overall game hit frequency is 19.22%, which is the sum of the hit frequencies of the winning outcomes.

The "Contribution" column is achieved by multiplying the value in the "Pay" column with the value in the "Hit Freq" column. This contribution relates to the relative or normalized weight each outcome has on the payback percentage of the game. The sum of these contributions results in the overall payback percentage of the game, which in this example is 94.06%. The hold percentage of a gaming device is simply 100% minus the payback percentage. Thus, in this example, the hold percentage of a gaming device using this paytable would be 5.94%. The contribution column provides a method of determining what portion of a paytable is directed to a particular outcome.

Referring to the reel strips illustrated in FIG. 4B, each reel of this three reel gaming device includes twenty two reel stop positions. The odd reel stops are not associated with an illustrated symbol and are referred to as "blanks." The even reel stops are associated with particular symbols involved in the game. For example, the illustrated reel strip for "Reel 1" includes a cherry symbol at reel stop 2 followed by a bar symbol, a "7," a double bar, a jackpot symbol, a triple bar, another bar symbol, another cherry symbol, another double bar, another "7," and another triple bar with blanks interspersed in between each of the illustrated symbols. The reel strips for "Reel 2" and "Reel 3" are similarly set up although the actual number and order of the symbols varies. Note that the bonus symbol "BN" only appears on the third reel.

In operation, some of the embodiments of this concept work differently than the embodiments discussed in the Ser. No. 12/542,587 application. That is, in the Ser. No. 12/542,587 application, operation of the gaming device includes obtaining a random number or indicator once the player has pulled a game handle or pressed a game initiating button, and normalizing this random number to match one of the ranges associated with the paytable weights for each outcome. On the other hand, some of the embodiments of this concept determine when a specific outcome will occur within a specific range of games before the games are played.

Referring to FIG. 4C, an exemplary selection chart for game outcomes is shown. This chart shows how many games until a specific winning outcome will occur. For example, for the Cherries outcome, a number is selected between 1 and 24, which is the Game Range specified for Cherries. The first selection or trigger number is game 3. The first trigger number for an Any Bars outcome is game 2. The first trigger numbers for the other winning outcomes are shown in the first selection column. Second through tenth selection columns are also shown in the Selection Chart. These outcomes may be selected before the first selection is realized, or the associated trigger number for each of these selections may not take place until after the preceding trigger number has been reached and the outcome awarded.

Referring to FIG. 4D, an exemplary game outcome table is shown that corresponds to the selection chart of FIG. 4C. As can be seen in the selection chart and outcome table, no outcome is specified for the first game. Hence a generic losing outcome is indicated in the first game position. When a player places a wager on the gaming device that corresponds to this first game, the player will receive a losing game outcome. Since a generic losing outcome is indicated, the gaming device may use a process similar to the ones described in the Ser. No. 12/542,587 application to select an actual losing combination of symbols or cards to display. As a brief review, some of these processes may include selecting an outcome to display by a random or other selection process and ensuring that the selected outcome does not have any awards associated with it. FIG. 8 of the Ser. No. 12/542,587 application provides one example flow chart of this process.

To keep track of the game number in the game outcome table, a counter may be used to indicate a current game within the table. In other words, the counter may keep track of a game number count for the gaming device to ensure that a proper game outcome from the game outcome table is used as a current game outcome. The counter may simply be a dedicated register or portion of memory that is incremented with each game, or it may be an integrated address pointer embedded in the firmware of the gaming device or other equivalent mechanism. As each game progresses, the counter is incremented to indicated a next game number. In some embodiments, the counter is incremented as a result of a game initiating input, in which case the new game outcome associated with the game number indicated by the counter after being incremented will be the outcome used for the game. In other embodiments, the counter is incremented after a game has been played, in which case the current game outcome associated with the game number indicated by the counter at the time of the game initiation input is received will be the outcome used for the game.

When a player places a wager on a game corresponding to the second game number in the game outcome table, the gaming device displays an "Any Bars" winning outcome on the game display payline because the game outcome table indicates that this winning outcome is associated with the second game number. After this winning outcome is displayed, the player is awarded three times their wager (e.g., 3 credits on a 1 credit bet). Referring back to the selection chart in FIG. 4C, in embodiments where entries in the selection chart are not completed until after a preceding selection has been reached, a second selection for the Any Bars winning outcome would be determined before the next game was initiated. Here, for example, the second game-trigger number for the Any Bars outcome within the game range of 1 to 30 ends up being 28. As the counter already indicates that a game number count is on game number two, the trigger number of 28 is added to the game number count of two so that the next occurrence of the Any Bars outcome will be at game number 30, as shown in FIG. 4D. In other embodiments, where multiple outcome selections are made at a given time, the second trigger number for the Any Bars outcome may have already been selected as 28 and inputted into the game outcome table at game number 30.

Figure 7:
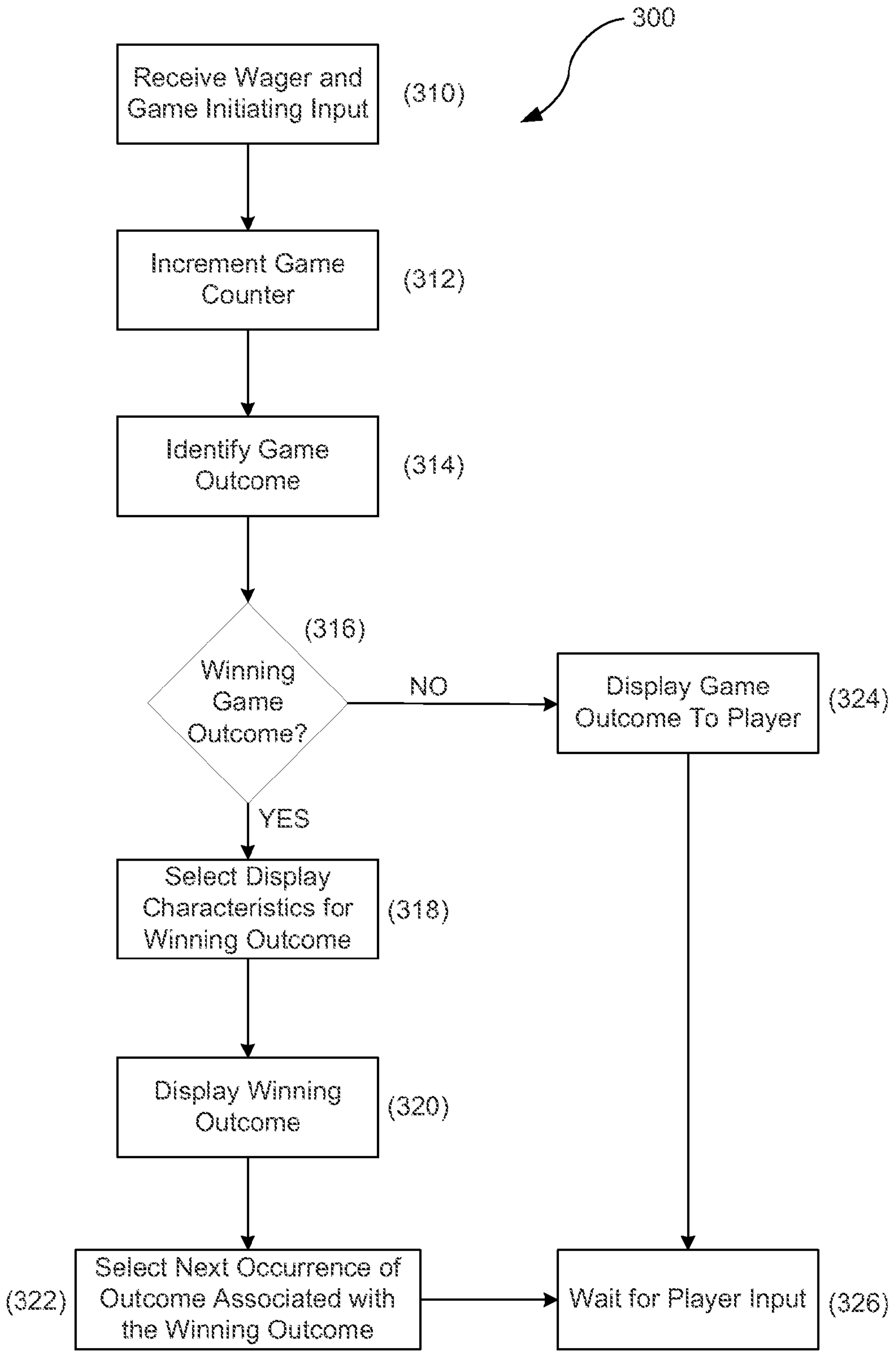
FIG. 7 is a flow diagram of a method of determining a game outcome on a gaming device according to embodiments of the invention.

As an Any Bars outcome is indicated as a winning outcome to this second game, the gaming device needs to select a proper symbol combination on the game payline to result in this indicated game outcome. The gaming device may use a process similar to the ones described in the Ser. No. 12/542,587 application to select a winning combination of symbols or cards to display as the winning outcome. As a brief review, some of these processes may include identifying reel positions or cards associated with the winning outcome, selecting among the identified reel positions or cards to determine ones to use in the displayed outcome, selecting any remaining reel positions or cards to complete the display, and ensuring that these remaining selections do not affect the game outcome. FIG. 7 of the Ser. No. 12/542,587 application provides one example flow chart of this process.

The next game that is wagered on by a player, game number 3, is associated with a winning Cherries outcome as shown in the game outcome table illustrated in FIG. 4D. The display and awarding of this winning outcome may be similar to the winning Any Bars outcome from game number two. Additionally, in embodiments where only a single outcome occurrence is predetermined at any given time, a second trigger number may be selected for the selection table. As shown in FIG. 4C, the selection of the trigger number within the specified range of 1 through 24 is 14. As shown in the outcome table, this trigger number selection results in the next Cherries outcome being scheduled for game number 17.

Games 4 through 16 do not have winning game outcomes. Hence, wagers placed on these games will result in losing outcomes. In some embodiments, losses may be only briefly displayed while wins are displayed for a longer period of time as described in co-pending U.S. patent application Ser. No. 12/204,633, filed Sep. 4, 2008, entitled GAMING DEVICE HAVING VARIABLE SPEED OF PLAY, the teachings of which are incorporated herein by reference. That is, in these embodiments the losses in games 4 through 16 may be shown briefly if at all while another wager is automatically deducted from the credit meter and subsequent game is played without further player input. Some of these embodiments may halt the automatic rewagering and game reinitiation when a winning game outcome is reached.

This series of operational steps in this example embodiments continue through the other indicated games in the game outcome table. Notice, however, that game number 67 has both a Double Bars outcome and a Single Bars outcome scheduled for the same game number. This has occurred since a first trigger number for the Double Bars outcome was selected to be associated with the 67$^{th}$ game while the second trigger number for the Single Bars outcome of 14 was chosen after a first trigger number of 53 was selected. Hence, the second occurrence of the Single Bars outcome is also associated with the 67$^{th}$ game. Various embodiments of this concept handle this situation in different manners.

In one set of embodiments, another trigger number may be selected for the second selection of the Single Bars outcome. That is, the gaming device may inquire whether a selected trigger number attempts to associated a corresponding winning game outcome with a game number that already has a winning game outcome associated with it. If this inquiry determines that a winning game outcome is already associated with the game number, the gaming device may select another trigger number within the specified game range until the inquiry determines that the selected trigger number does associate a winning game outcome with a game number that already has an associated winning game outcome. These embodiments ensure that only one winning game outcome will occur during a game being played on the gaming device. In other sets of embodiments, the gaming device does not select a subsequent trigger number and takes one of a variety of actions to deal with this positional "tie" for the winning game outcomes. These actions of this set of embodiments are discussed in more detail below with reference to FIGS. 9A, 9B, and 9C. Briefly, the gaming device may award both prizes during a game corresponding to the game number with the positional tie, the gaming device may only display the larger valued award for a game corresponding to the game number with the positional tie, or the gaming device may "push" one of the winning game outcomes to a future game number.

FIG. 4D illustrates an embodiment where each outcome is entered into a single game outcome table. A counter proceeds through the single game outcome table to determine a current game outcome in response to a wager. FIG. 4E, on the other hand, illustrates an embodiment where a table and counter are implemented for each type of winning game outcome. Referring to FIG. 4E, a game outcome table is shown for each of the winning game outcomes of Cherries, Any Bars, Single Bars, Double Bars, Triple Bars, Sevens, the Bonus, or the Jackpot. Hence, eight outcome tables are present in this embodiment. Further, a counter is used for each of these game outcomes to determine whether that winning game outcome should be displayed and awarded during a current game. These counters are shown in FIG. 4E as the highlighted boxes over the game results. Here, the game outcome table for each winning game outcome is set to possible range of the associated winning game outcome. For example, the game outcome table for the Cherries outcome is set to 24 since the Cherries outcome will hit within the range of 1 to 24 games. The Double Bars game outcome table, on the other hand, is set to 180 (not completely shown in FIG. 4E for the sake of brevity).

Here a trigger number for the next occurrence of each winning outcome is selected and entered into each game outcome table. For example, the trigger number for the next Cherries outcome was selected as game 17, while the next winning Double Bars outcome was selected as game 6. During a game, each game counter is incremented to a next game number in the game outcome table. Thus, for example, after a game is initiated, the game counter for the Cherries outcome may be incremented from game number 13 to game number 14, and the game counter for the Any Bars outcome may be incremented from game number 10 to game number 11, etc. Since game number 11 for the Any Bars outcome is associated with a winning occurrence of the Any Bars outcome, the gaming device will display an Any Bars winning game outcome to the player and award the player with three times their credit wager. After awarding the player with this winning outcome, the gaming device will then select another triggering value for the Any Bars outcome and reset the counter associated with the Any Bars outcome to zero. Any entries between the triggering value and the initial game outcome table value may be indicated as a generic losing outcome in the game outcome table.

Hence, in operation, the gaming device increments each of the counters associated with the winning game outcomes in the game outcome table and determines whether any of the incremented counters indicates a winning game outcome. If more than one winning game outcome is indicated by the counters during a game, the gaming device may use one of the positional tie methods mentioned above and discussed below with respect to FIGS. 9A, 9B, and 9C.

The process of setting up the game outcome table of FIG. 4D or 4E and/or selection chart of FIG. 4C may be done one or more times during the operation of the gaming device. In one example, a game outcome table is initiated when it is placed on a gaming floor and continues to operate by selecting future game outcomes until it is removed from the game floor. In other examples, the game outcome table may be reset by casino personnel or be reset automatically at a periodic interval, such as at a nightly or weekly reset time. In yet other examples, the game outcome table may be reset between players playing the gaming device. In some embodiments, the game outcome table may be associated with a particular identified player such that the game outcome table for a type of gaming device is saved in a player's account associated with the player, and retrieved and implemented on a gaming device matching the gaming device type associated with the game outcome table when a player identifies herself at that matching gaming device.

As discussed above, the Game Ranges may be set in a paytable illustrated in FIG. 4A in a variety of manners. Although the embodiment discussed above uses preselected game ranges to provide a boundary within which a game outcome trigger number is selected, this range may be altered for one or more of the winning game outcomes in response to an instruction by a casino operator or in response to a gaming event. For instance, certain gaming events on the gaming device may trigger the selection of a smaller or larger range for at least one type of gaming outcome. In one example, a gaming device may be configured to lower the range for a Cherries game outcome from at least once every 24 games to at least once every 20 games for players who have signed up for a player's account within the last 24 hours. In another example, the gaming device may provide a Cherries award if no winning outcome has been reached in twenty consecutive games. In this example, the gaming device may automatically reset the Game Range Value of the Cherries outcome to a range of 1 to 1 and "select" a number between 1 and 1. Obviously this technique has the effect of directing the gaming device to award a specific game outcome. In practice this Cherries outcome is the result of a device instruction rather than a result associated with a randomly obtained indicator. Other circumstances exist in which a Game Range may be altered to create a desired effect on the gaming experience of a player.

The trigger number selected in the Game Ranges may be selected using a random number generator to generate a random decimal value between zero and 1. This number would be normalized to the range parameters by multiplying the random decimal value by the upper limit of the range minus one, adding one, and rounding to the nearest integer number. For example, for the Cherries outcome, which has a specified range of 1 to 24, a normalized random trigger value would be assigned a value between 1 and 24. For example, if the random number was 0.56879845, the normalized random number would be 13.08236435, or 14.08236435 with one added to it, resulting in a winning game triggering number of 14.

The above description focuses on a spinning reel gaming device having a single payline. However, other embodiments of this concept are adapted to work with multi-line gaming devices. One of the significant issues in accommodating multi-line gaming devices is that a player playing multiple pay lines is essentially placing a wager on each of the paylines and an outcome determined on one payline may not correspond to the symbols needed for another outcome on another played payline. When using a table of gaming outcomes to determine a game outcome for a current multi-line game there are many techniques available to determine which outcomes to use and/or display. One exemplary technique simply uses different Game Ranges based on the number of lines that are being played. For example, a gaming device may use one set of game ranges if the player is only playing one payline of a multi-line gaming device, and use a second set of game ranges if the player is playing 5 lines on the gaming device.

One issue to address in this technique is if and how to change a currently selected trigger number and/or range when a player changes between playing one payline and multiple paylines. In some embodiments, the ranges for all of the outcomes may be reset and new trigger numbers may be selected. For winning game outcomes with trigger numbers that were scheduled to fall within the new range size for each outcome, the same trigger numbers may be kept and transferred over to the new ranges. Alternatively, a new trigger number may be selected within the new range and lower game number between the new trigger number and the old trigger number may be used as the trigger number associated with the winning game outcome for the next game or series of games. Going the other way, that is when a player goes from playing multiple lines to a single payline or a lower number of played paylines, the gaming device may increase the game range size for at least one of the game outcomes. New trigger numbers for the winning game outcomes may be determined and averaged with the old trigger numbers to prevent a player from simply switching between single line and multi-line play to improve their chances of receiving a winning game outcome sooner.

Instead of changing the Game Ranges for the winning outcomes, other embodiments may simply cover multiple "chunks" of the game outcome table in a single multi-line game. For example, if a player was playing all five paylines of a five line game using the game output table illustrated in FIG. 4D, the first five game numbers would be used to determine if any wins were awarded to the player based on their wager. Here, since game numbers 2 and 3 are associated with winning outcomes, the gaming device must determine if and how to award and/or display these winning games outcomes. To accomplish this, the gaming device may use a technique similar to the multi-line outcome determination and display techniques discussed in the Ser. No. 12/542,587 application. In particular, techniques to handle multi-line games are discussed with respect to FIGS. 5A-5C and 9-11. These techniques in the Ser. No. 12/542,587 application include the step of selecting a game outcome for the next line played (see e.g., FIGS. 9 and 10) or simply selecting a single game outcome (see e.g., FIG. 11). Using the game outcome tables illustrated in FIGS. 4D and 4E of the present application, the game selection process would simply use the incrementing game counter to "select" the next game outcome from the game outcome tables.

For illustration purposes use of the game outcome table shown in FIG. 4D will be discussed for a five line game where all five paylines are being played using some of the exemplary techniques for handling multi-ling games discussed in the Ser. No. 12/542,587 application. For the technique relating to FIG. 9 in the Ser. No. 12/542,587 application, the winning outcomes of game numbers 1 through 5 are analyzed. Since game numbers 2 and 3 are associated with winning game outcomes, these winning game outcomes would be stored in memory, display characteristics would be chosen for them, and they would be displayed in multiple steps to the player. For the technique relating to FIG. 10 in the Ser. No. 12/542,587 application, the winning outcomes of game numbers 1 through 5 are again analyzed. However, since only the highest paying winning outcome will be awarded to the player, the player will only be awarded the Any Bars outcome and not the Cherries outcome since the Any Bars outcome has a higher paying award associated with it. For the technique relating to FIG. 11 in the Ser. No. 12/542,587 application, a single outcome is selected from game numbers 1 through 5 to be used as the game outcome. This may include randomly selecting one of the game numbers 1 through 5 and using the game outcome from the game outcome table associated with the selected game number as the game outcome. Although three of the techniques from the Ser. No. 12/542,587 application are discussed, various other techniques may be used and are contemplated by this concept.

The multi-line selection methods described above focus on gaming devices that may have fixed reel strips. That is, reel strips that correspond to each reel of the game device and do not change between games. However, for gaming devices that use individual reel strips for each symbol position on a gaming display ("super spin" games) or for gaming devices that use flexible reel strips, alternative multi-line techniques may be available. Super spin games and flexible reel strip games have the ability to select a symbol for every displayed symbol position on a gaming display. Thus, more detailed selection processes may be used in choosing the symbols to display on the screen. In one example, a multi-line game may select an outcome for each played line where the game locks in winning outcome symbol positions for paylines that are determined earlier. That is, if a player is playing a five line game (FIG. 2B) and a three bar winning outcome is selected on the first payline (the horizontal middle payline), the first three symbols on that payline are "locked in" with bar outcomes. If the outcomes on the fourth or fifth payline are selected such that they require a symbol different than a bar symbol in the second position on the payline (where the left-most cherry is in FIB. 2B), the gaming device may select another outcome until an outcome is compatible with the bar symbol or employ one of the multi-line techniques discussed above. Alternatively, once a winning outcome is "locked in," the remaining outcomes on other paylines may be selected from a subset of the possible outcomes that correspond to the previously selected locked-in outcome. The symbols on these dynamically flexible reel strips may be determined and arranged prior to the spinning of the reels so that the symbol arrangements on the reel strips do not appear to get altered as the reel strips are slowing down and stopping.

As discussed above, this concept is not limited only to slot machine gaming devices. Rather, this outcome determination concept can be used with a variety of different gaming device types or themes. For example, this concept may be used with keno, video blackjack, video poker, etc. In a video poker example, winning poker hands with associated game ranges would be implemented in a paytable and a selection chart and game outcome tables would be created for game outcomes. FIG. 12 in the Ser. No. 12/542,587 application discusses a method of selecting and showing an outcome for a video poker gaming device that may also be used to display a video poker game outcome indicated by a counter in a game outcome table according to embodiments of this concept.

Figure 5:
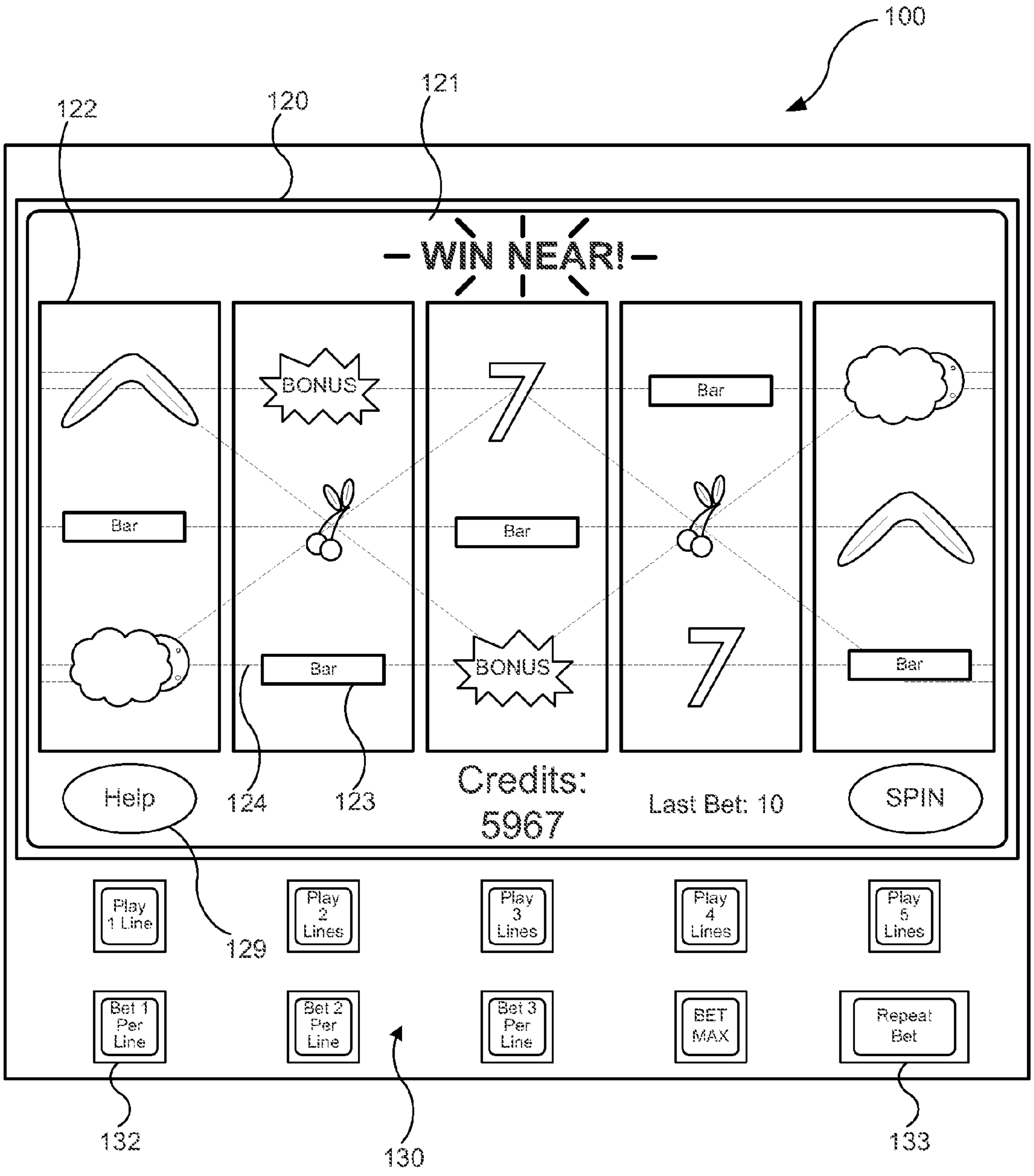
FIG. 5 is a detail diagram of a gaming device according to embodiments of the invention.

FIG. 5 is a detail diagram of a gaming device according to embodiments of the invention.

Referring to FIG. 5, a game device 100 may include a player interface panel 130 having one or more game buttons 132 and a game initiating button 133, and include a game display 120 showing a plurality of game reels 122 on which game symbols 123 are shown. One or more game paylines 124 may also be shown on the game display 120 to illustrate which symbol combination arrangements will result in a winning game outcome. The game device also includes a win proximity indicator 121. In the embodiment shown in FIG. 5, the win proximity indicator 121 is a flashing sign on the gaming display 121. The win proximity indicator may be presented when a winning game outcome will be reached in the next few games. Embodiments of this concept are especially well suited to the use of a win proximity indicator because the next winning game outcome can be easily determined by analyzing the game outcome tables that determine the next string of game outcomes. For example, referring to FIG. 4D, if a current game number was game 15, the win proximity indicator 121 may be activated since a winning game outcome will be awarded in two more games. This win proximity indicator may generate player excitement and prolong play on the gaming device because the player knows that a win is imminent when the win proximity meter is activated.

The win proximity indicator may be presented in different manners depending on the type of winning game outcome that is imminent. For example, if a relatively low paying winning game outcome is near, the win proximity indicator may slowly flash yellow. The flash rate may increase as the winning game outcome becomes closer. However, if a relatively large paying winning game outcome is near, the win proximity indicator may rapidly flash red and have an accompanying audible signal associated with it. The flashing and audio signal may intensify as the winning game outcome becomes closer. The player may also activate a game button 132 or soft button 129 to remove the flashing or sound associated with the win proximity indicator so it does not become overly annoying to players sensitive to flashing lights and/or loud sounds. In another embodiment, the indication that a win is growing closer could be the same for all wins, regardless of magnitude, if it is desirable to not allow the player to know what size of win is near.

In yet another embodiment, the indication that a win is near may begin with the same or substantially similar pattern and continue to change as a winning outcome becomes closer and the award associated with the winning outcome grows. For example, in two separate gaming instances, a winning outcome with an award amount of 5 credits and a winning outcome with an award amount of 50 credits may each trigger a win proximity indicator 121 to appear and slowly begin to flash at time T0. At time T1, the win proximity indicator 121 for each of the two instances may begin to flash slightly more rapidly. At time T2, the gaming device 100 may display the winning outcome with the award amount of 5 credits in one instance, and may increase the flash-rate of the win proximity indicator 121 in the other winning outcome instance. The gaming device 100 may then display the winning outcome with the award amount of 50 credits at time T3. Note that when the win proximity indicator 121 first appears, the player does not know if it is indicating that a relatively small award is near or a relatively large award is near because the indicator pattern is substantially the same in both instances. However, as the games progress, the smaller win is awarded relatively close to appearance of the win proximity indicator 121 while the larger win takes a few more games to reach. Thus, for small wins, the win proximity indicator 121 does not build and build on itself only to provide a small award, which may be a slight disappointment to the player. On the other hand, larger wins may take longer to reach, thereby building player anticipation. From the player's perspective, each game played that does not result in a win after the win proximity indicator 121 appears means that the award is potentially larger. The actually time or number of games between triggering the win proximity indicator 121 and displaying the winning outcome may be chosen from weighted ranges so that a player is never completely sure what award value corresponds to a particular delay time between activation of the indicator and display of the winning outcome.

Figure 6:
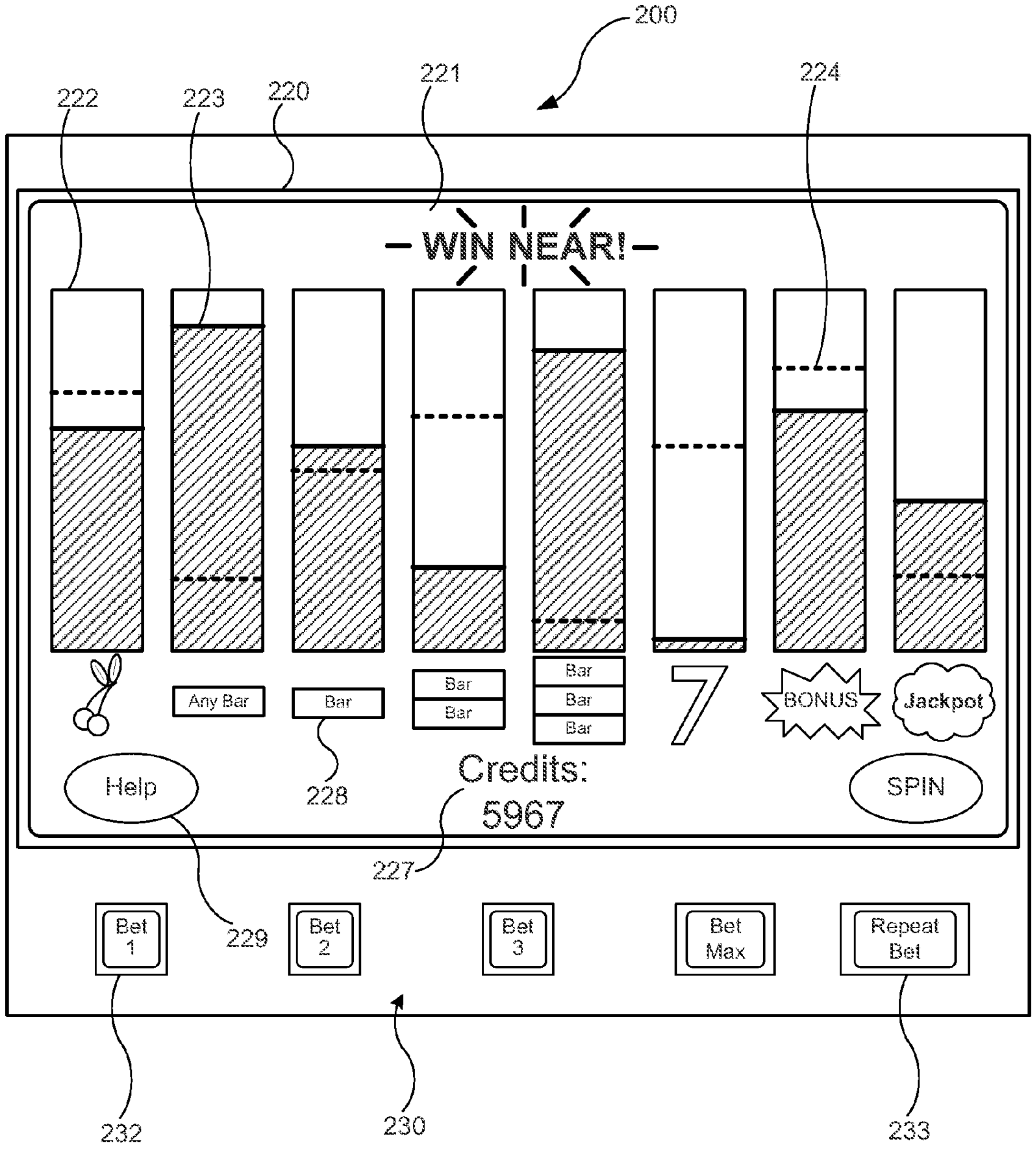
FIG. 6 is a detail diagram of another gaming device according to embodiments of the invention.

FIG. 6 is a detail diagram of another gaming device according to embodiments of the invention.

Referring to FIG. 6, the gaming device 200 again includes a player interface panel 230 having one or more game buttons 232 and a game initiating device 233. The gaming device 200 also includes a game display 220 having a credit meter 227. FIG. 6 actually illustrates two different gaming device 200 embodiments. The first embodiment illustrated by FIG. 6 is a second screen informational screen that can be reached by a player by pressing one of the soft buttons 229 on the game display 220 to go from a game screen (such as the one shown in FIG. 5) to this outcome proximity screen that shows a win proximity meter 222 for each winning game outcome. Here, each win proximity meter 222 includes a current proximity level 223 and an indication of when the last occurrence 224 of the winning game outcome occurred relative to the proximity meter 222. Additionally, an outcome label 228 may be included near each win proximity meter 222 to identify which game outcome is associated with each win proximity meter 222. This embodiment may be especially suited to embodiments that utilize an outcome table for each winning game outcome, such as the embodiments shown in FIG. 4E. Although this embodiment is shown as a second screen display, these proximity meters may be shown along with a game screen on the game display 220 or shown on a secondary display 25 (FIG. 1A) so that a player does not have to switch been the game screen and this second screen to see how the win proximity meters 222 are changing as a result of game play.

The second embodiment illustrated by FIG. 6 is a gaming device 200 that only displays the win proximity meters 222 as the game theme (e.g., METER FEVER). Here, the player is wagering on the movement of the win proximity meters 222. There is no spinning reels or cards to play. Rather, the player is wagering that the next game will bring a win from one or more of the meters 222. The win proximity meters 222 associated with the lower paying awards (e.g., Cherries, Any Bars, etc.) may move fairly quickly between games since, for example, the Cherries outcome hits on average once every 12 games. The meters associated with the higher paying outcomes may, on the other hand, move fairly slowly. This gives a player an incentive to keep playing the gaming device 200 when one of the meters 222 associated with a higher paying award starts getting near the top of the meter range. For example, a player may notice that the win proximity meter associated with the Triple Bars outcome is due to hit relatively soon. A win proximity indicator 221 may be used in conjunction with the win proximity meters 222 to indicate that a win on one of the meters is imminent. For these gaming devices, the win proximity indicators 121 may be hidden or return to a generic screen when a player is not playing the gaming machine to prevent players from "shopping" for a favorable looking (i.e., mostly filled) proximity meter on a gaming device.

FIG. 7 is a flow diagram of a method of determining a game outcome on a gaming device according to embodiments of the invention.

Referring to FIG. 7, an example flow 300 begins by receiving a wager and game initiating input in process (310). In process (312), the gaming device increments the at least one game counter associated with the game outcome table. In embodiments that utilize a single outcome table combining all of the winning outcomes (FIG. 4D), a single counter may be incremented between game numbers. In embodiments that utilize separate game outcome tables for each winning outcome (FIG. 4E), each of the counters associated with the separate game outcome tables may be incremented. As discussed above, although the process of incrementing the at least one game counter (312) is shown immediately after receiving the game initiating input in FIG. 7, this process can be implemented at other times within a game cycle in other embodiments.

The gaming device then identifies a game outcome associated with a game number indicated by the game counter in process (314). In process (316) the gaming device determines whether the identified game outcome is a winning outcome. If the identified game outcome is not a winning game outcome, the gaming device may select a losing outcome and display this losing outcome to the player in process (324) as discussed above. If the identified game outcome is a winning game outcome, the gaming device selects display characteristics of the winning outcome in process (318) and displays the winning outcome in process (320) as discussed above. When the game outcome is determined to be a winning game outcome in process (316), the gaming device also may select a next occurrence of the outcome-type associated with the winning outcome in process (322). That is, in embodiments where only next occurrence of a winning outcome is determined, when that trigger number of the winning outcome is reached, a new trigger number is selected in process (322) for that outcome and implemented in the game outcome table. After the game outcome has been displayed to the player in either of process (324) or (320), the gaming device may then wait for further player input in process (326).

Figure 8A:
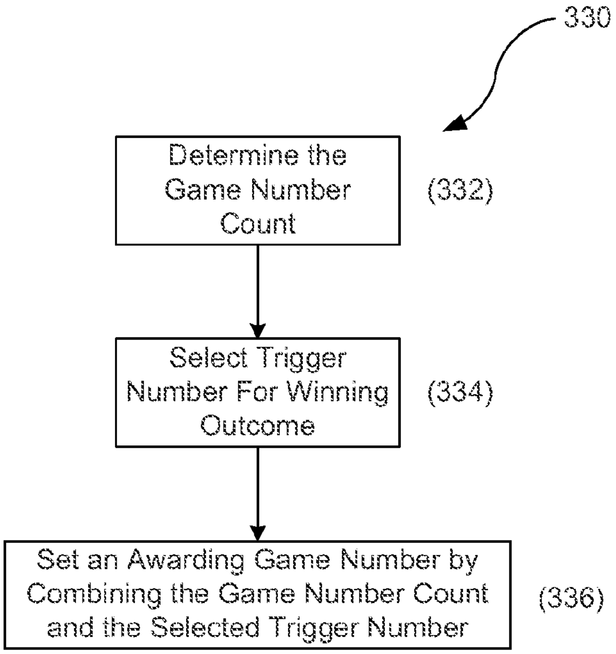
FIGS. 8A and 8B are flow diagrams of methods of setting an outcome trigger number on a gaming device according to embodiments of the invention.
Figure 8B:
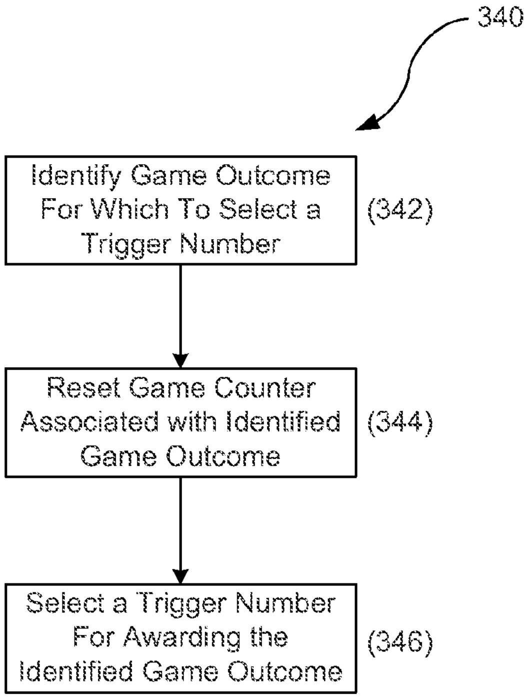

FIGS. 8A and 8B are flow diagrams of methods of setting an outcome trigger number on a gaming device according to embodiments of the invention.

Referring to FIG. 8A, flow 330 is directed to embodiments where a single game outcome table is used, such as in FIG. 4D. Here, flow 330 begins by determining the current game count number in process (332). A trigger number is selected for the next occurrence of a winning outcome in process (334). Afterwards, an awarding game number in the game outcome table is set by combining the determined game count number and the selected trigger number in process (336).

Referring to FIG. 8B, flow 340 is directed to embodiments where each of the counters is associated with separate game outcome tables. Here, flow 340 begins by identifying the winning game outcome and outcome table for which to select a new trigger number in process (342). Once the game outcome table has been identified, the game counter is reset for that game outcome table in process (344) and a new trigger number is selected for the identified game outcome table in process (346).

Figure 9A:
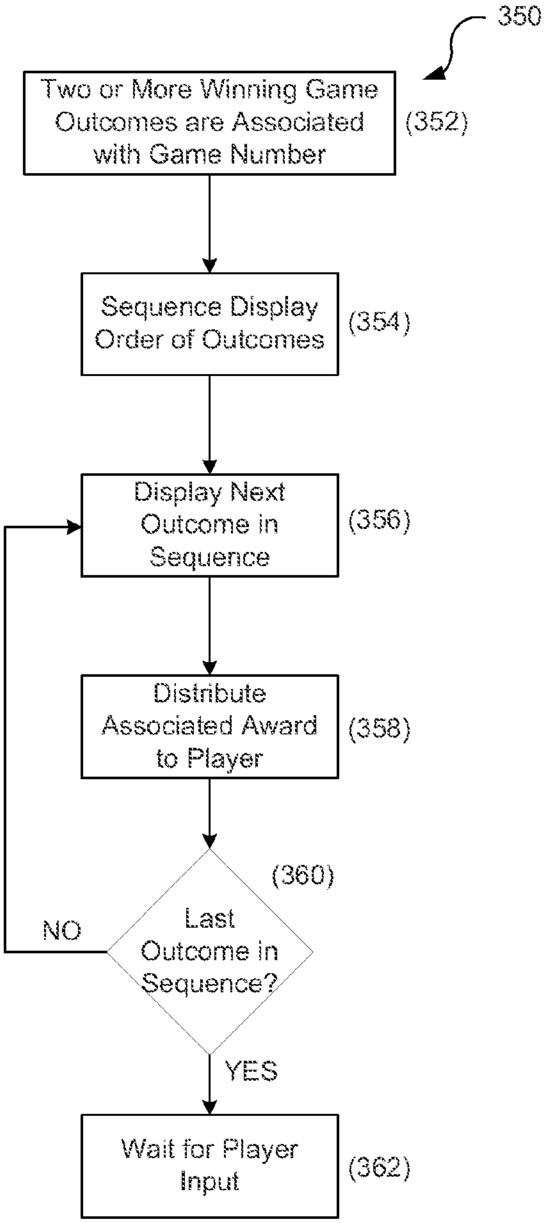
FIGS. 9A, 9B, and 9C are flow diagrams of methods of operating a gaming device when multiple winning game outcomes are indicated for a single game.
Figure 9B:
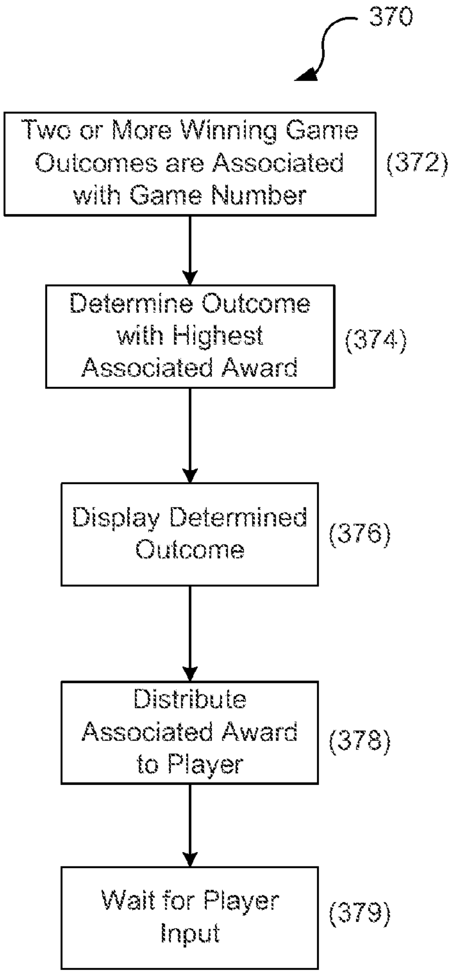
Figure 9C:
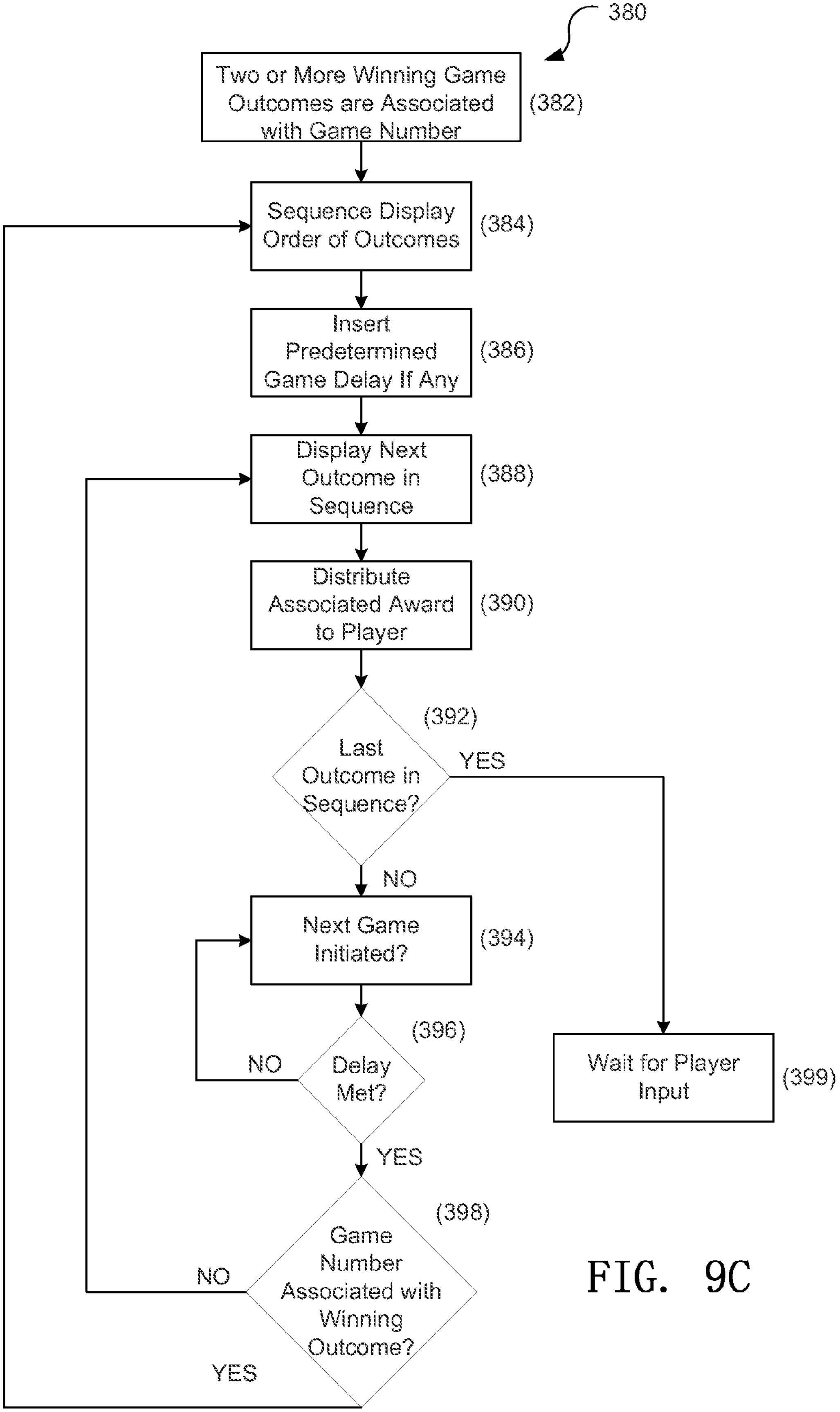

FIGS. 9A, 9B, and 9C are flow diagrams of methods of operating a gaming device when multiple winning game outcomes are indicated for a single game. FIG. 9A is directed to embodiments where each of the multiple winning game outcomes is displayed during the game. FIG. 9B is directed to displaying only the winning game outcome with the largest associated award. FIG. 9C is directed to displaying a single winning game outcome during the triggering game and pushing the other winning game outcomes to later games.

Referring to FIG. 9A, flow 350 begins when the gaming device determines that two or more winning game outcomes are associated with a current game number in process (352). Thereafter, the gaming device sequences the display order of the winning game outcomes in process (354). Here, the gaming device may sequence the winning game outcomes such that they are displayed in order of smallest associated award to largest associated award. This sequencing may generate additional player anticipation and excitement as the player may think that the game is over after a first winning outcome is displayed only to have another game outcome be displayed with an even higher award value. Other embodiments may utilize different criteria to sequence the winning outcomes. For example, a random order may be used in the sequence.

The gaming device displays the first game outcome of the sequence in process (356) and distributes an award associated with the winning game outcome to the player in process (358). It is then determined if the last outcome of the sequence has been reached in process (360). If the last winning game outcome has not been reached, the gaming device displays the next winning game outcome in process (356) and distributes an associated award in process (358). This cycle is repeated until each of the game outcomes in the sequence been displayed. When process (360) determines that the last winning game outcome in the sequence has been displayed, flow 350 may conclude by waiting for further player input in process (362).

Referring to FIG. 9B, flow 370 begins when the gaming device determines that two or more winning game outcomes are associated with a current game number in process (352). Thereafter, the gaming device determines which of the multiple winning game outcomes has the largest associated award in process (374). When the winning game outcome with the largest associated award is determined, that winning game outcome is displayed to the player in process (376) and the associated award is distributed to the player in process (378). Flow 370 then concludes by waiting for further player input in process (379).

Referring to FIG. 9C, flow 380 begins when the gaming device determines that two or more winning game outcomes are associated with a current game number in process (352). Thereafter, the gaming device sequences the display order of the winning game outcomes in process (384). Here, the gaming device may again sequence the winning game outcomes such that they are displayed in order of smallest associated award to largest associated award, or sequence them in a random order. In process (386), the gaming device inserts a predetermined delay, if any, between the display timing of the winning game outcomes. In other words, the gaming device pushes the later winning game outcomes in the sequence to later games that are not associated with a winning game outcome. Here, the first winning game outcome is displayed in process (388) and an associated award is distributed to the player in process (390). Process (392) determines if the last winning game outcome in the sequence has been reached. If is has, flow 380 concludes by waiting for further player input in process (399). However, when process (392) determines that the last winning game outcome has yet to be reached, the gaming device pauses until the next game has been initiated in process (394). Depending on the type of embodiment, the next game may be initiated when the player has placed another wager and activated a game initiating input device. Alternatively, the next game may be automatically initiated by the gaming device.

When the next game has been initiated, the gaming device determines if the inserted delay has been met in process (396). In some embodiments, the next winning game outcome may be pushed to the next game number, in which case there would not be an inserted delay beyond waiting for the next game to be initiated. In other embodiments, however, a delay of one or more games may be specified to spread the occurrence of the winning game outcome over a larger range of games. In these embodiments, processes (394) and (396) would cycle until the predetermined delay was met. When the delay is met in process (396), the gaming device determines if the current game number is already associated with another winning game outcome in process (398). This process ensures that one of the multiple winning outcomes is not pushed to a game number that already has a winning outcome associated with it. Thus, if it is determined that the current game number does not have a winning game outcome associated with it, flow 380 repeats processes (388) and (390) to display the next winning game outcome in the sequence and distribute an associated award to the player. This process may be repeated until each of the winning game outcomes is displayed. If, however, it is determined in process (398) that the current game number is associated with a winning game outcome, flow 380 returns to process (384) to again sequence the display order of the remaining winning game outcomes and the new winning game outcome associated with the current game number. Flow 380 would then repeat the processes of inserting delays if any (386), displaying the next winning game outcome in the new sequence (388), and distributing an associated award to the player (390). This cycle is repeated until each of the winning game outcomes in the new sequence is displayed.

Although not shown in a flow diagram, other embodiments avoid the issue of having two awards tied to a single game number by incrementing separate counters for each possible winning game outcome one at a time. If the first incremented counter results in a winning game outcome being associated with a game number, no other counters are incremented. Rather, the other counters remain frozen, thus assuring that two wins will not occur. By setting the incrementation rules of the counters in such a manner, the order of multiple awards can be managed. That is, if the counters are incremented from the largest-valued winning game outcome to the smallest-valued winning game outcome, the highest paying award would be given first and the smaller award or awards would be given over the next series of games. Alternatively, if the counters are incremented from the smallest-valued winning game outcome to the largest-valued winning game outcome, the smallest paying award would be given first and additional higher paying awards would be distributed in the following series of games. This process has an effect on the hit frequencies of the winning game outcomes and on the theoretical payback of the gaming device. However, these effects can be reduced by testing the remaining counters after one counter has been determined to have reached a winning outcome triggering number and incrementing the other counters that are not associated with a winning outcome triggering number. Additionally, the game ranges may be slightly altered (either dynamically or by design pre-game play) for these embodiments to account for the remaining effect of these incrementation rules.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a gaming device, the method comprising:
- receiving value from a player for wagering on the gaming device via one of a bill acceptor and a ticket acceptor associated with the poker gaming device;
- validating via the acceptor one of a bill and a ticket received at the acceptor;
- determining a game number count;
- selecting a triggering game number from a predetermined range of game numbers for a winning game outcome;
- entering the selected triggering game number in a common game outcome table having a plurality of winning outcomes and entries preceding the selected game triggering number filled with a generic losing outcome;
- receiving a game initiating input;
- incrementing the game number count;
- when the game number count is greater than or equal to the triggering game number, selecting one game winning outcome from the table; and
- displaying the selected one winning game outcome.

2. The method of claim 1, wherein selecting one game winning outcome from a table having a plurality of winning outcomes comprises weighing the selecting so that some winning outcomes are selected more frequently than others.

3. The method of claim 1, wherein incrementing the game number count includes advancing to a next entry in the common game outcome table.

4. The method of claim 1, wherein incrementing the game number count includes advancing to a next entry in the game outcome table.

5. The method of claim 1, further comprising selecting another triggering game number from the predetermined range of game numbers for a second winning game outcome after the winning game outcome is displayed.

6. A method of operating a gaming device, the method comprising:
- receiving value from a player for wagering on the gaming device via one of a bill acceptor and a ticket acceptor associated with the poker gaming device;
- validating via the acceptor one of a bill and a ticket received at the acceptor;
- counting games played;
- presenting a player with a winning game outcome;
- selecting a next occurrence of a winning game outcome from a range of numbers corresponding to games played, including:
  - randomly selecting a number within the range of numbers; and
  - combining the randomly selected number with a current value of the game count;
- entering the selected next occurrence of a winning game outcome in a table of game outcomes;
- incrementing the game count responsive to each game played;
- when the game count indicates the next occurrence of a winning game, selecting one winning outcome from a table having a plurality of winning outcomes and entries preceding the selected winning outcome filled with a generic losing outcome; and presenting the player with the selected winning game outcome.

7. The method of claim 6, wherein selecting one game winning outcome from a table having a plurality of winning outcomes comprises weighing the selecting so that some winning outcomes are selected more frequently than others.

8. The method of claim 6, wherein entering the selected next occurrence of a winning game outcome in a table of game outcomes includes associating the next occurrence of a winning game outcome with a game number in the table of game outcomes.

9. The method of claim 8, wherein incrementing the game count includes sequentially moving between game numbers associated with game outcomes in the table of game outcomes.

10. The method of claim 9, wherein presenting the player with the selected game outcome includes displaying a winning game outcome and providing an award corresponding to the winning game outcome after selecting one winning outcome from the table.

* * * * *